United States Patent
Wolfe et al.

(10) Patent No.: US 12,086,636 B2
(45) Date of Patent: Sep. 10, 2024

(54) MEMORY-BOUND SCHEDULING

(71) Applicant: QUALCOMM Incorporated, San Diego, CA (US)

(72) Inventors: Jonathan Dewitt Wolfe, Austin, TX (US); Erich Plondke, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 17/463,393

(22) Filed: Aug. 31, 2021

(65) Prior Publication Data

US 2022/0066834 A1 Mar. 3, 2022

Related U.S. Application Data

(60) Provisional application No. 63/073,269, filed on Sep. 1, 2020.

(51) Int. Cl.
*G06F 9/50* (2006.01)
*G06F 8/41* (2018.01)
*G06F 9/48* (2006.01)

(52) U.S. Cl.
CPC ............ *G06F 9/5027* (2013.01); *G06F 8/433* (2013.01); *G06F 8/445* (2013.01); *G06F 9/4881* (2013.01)

(58) Field of Classification Search
CPC ........ G06F 9/5027; G06F 8/433; G06F 8/445; G06F 9/4881; G06F 9/5083; Y02D 10/00
See application file for complete search history.

(56) References Cited

U.S. PATENT DOCUMENTS

| 10,200,875 | B2 | 2/2019 | O'Shea | |
|---|---|---|---|---|
| 2001/0044850 | A1* | 11/2001 | Raz | H04L 65/1101 709/231 |
| 2008/0098375 | A1* | 4/2008 | Isard | G06F 11/1438 717/149 |
| 2009/0327195 | A1* | 12/2009 | Iscen | G06N 5/042 706/50 |

(Continued)

FOREIGN PATENT DOCUMENTS

WO 2015061239 A1 4/2015

OTHER PUBLICATIONS

International Search Report and Written Opinion—PCT/US2021/048745—ISA/EPO—Jan. 3, 2022.

*Primary Examiner* — Tuan C Dao
(74) *Attorney, Agent, or Firm* — Patterson & Sheridan LLP

(57) ABSTRACT

Certain aspects of the present disclosure provide techniques for generating execution schedules, comprising receiving a data flow graph for a process, where data flow graph comprises a plurality of nodes and a plurality of edge; generating a topological ordering for the data flow graph based at least in part on memory utilization of the process; generating a first modified topological ordering by inserting, into the topological ordering, one or more new nodes corresponding to memory access based on a predefined memory capacity; allocating units of memory in the memory based on the first modified topological ordering; and generating a second modified topological ordering by rearranging one or more nodes in the first modified topological ordering, where the second modified topological ordering enables increased parallel utilization of a plurality of hardware components.

27 Claims, 20 Drawing Sheets

(56) References Cited

U.S. PATENT DOCUMENTS

| | | | |
|---|---|---|---|
| 2012/0311302 A1* | 12/2012 | Yang | G06F 15/8076 |
| | | | 712/E9.034 |
| 2013/0055091 A1* | 2/2013 | Dutta | G06F 3/04842 |
| | | | 715/736 |
| 2013/0246731 A1* | 9/2013 | Lee | G06F 12/0284 |
| | | | 711/170 |
| 2015/0254130 A1* | 9/2015 | Sakaue | H03M 13/1137 |
| | | | 714/764 |
| 2015/0277794 A1* | 10/2015 | Tudor | G06F 3/0619 |
| | | | 711/103 |
| 2016/0357377 A1* | 12/2016 | Thimbleby | G06F 3/1454 |
| 2017/0076206 A1* | 3/2017 | Lastras-Montano | |
| | | | G06F 16/3344 |
| 2019/0180406 A1* | 6/2019 | Yang | G06F 9/4893 |
| 2019/0286972 A1* | 9/2019 | El Husseini | G06N 3/063 |
| 2020/0067783 A1* | 2/2020 | Kamath | H04L 41/12 |
| 2021/0133612 A1* | 5/2021 | Sinha | G06F 30/20 |

\* cited by examiner

MEMORY-BOUND SCHEDULING

CROSS-REFERENCE TO RELATED APPLICATIONS

This application claims benefit of and priority to U.S. Provisional Patent Application Ser. No. 63/073,269, filed Sep. 1, 2020, which is herein incorporated by reference in its entirety.

INTRODUCTION

Aspects of the present disclosure relate to computer processor operation scheduling, and in particular to improved operation scheduling for memory-bound systems.

A large variety of computing processes today involve execution of a number of discrete operations sequentially or in parallel. Scheduling these operations should account for data dependencies (e.g., if particular operations must be completed before certain subsequent operations). Computing systems often utilize memory with fast access, such as caches, tightly-coupled memory (TCM), static random-access memory (SRAM) and the like, to store the associated data needed for execution by each operation. In memory-bound systems, however, there may be insufficient space in these fast-access memories to store the entire sequence of operations and the accompanying data.

Executing such processes on a memory-bound system can reduce performance in a variety of ways. Though some data can typically be stored in fast-access memory such as caches, memory-bound systems often need to rely on larger and slower memories to store the remaining data. Because the larger host memory typically incurs significantly more computational cost than fast-access memories such as SRAM, it is useful to reduce the number of such memory accesses in order to improve the execution of the process. Generally, accesses to the host memory increase power consumption and latency and reduce the overall bandwidth of the computer. An important aspect of scheduling such operations is therefore reduction of memory accesses to the slower memory (e.g., host processing system dynamic random access memory (DRAM)).

Some existing schedulers utilize greedy heuristics and local optimizations toward the goal of developing an optimal schedule that reduces power consumption, latency, and memory accesses. A variety of approaches exist for balancing the competing goals, but such approaches are inherently local and sub-optimal solutions to a problem which is driven by a global structure of the computing process and operations.

Accordingly, what are needed are systems and methods to improve process scheduling in order to perform computer processing more efficiently.

BRIEF SUMMARY

Certain embodiments provide a method for generating execution schedules, comprising receiving a data flow graph for a process, wherein data flow graph comprises a plurality of nodes and a plurality of edges; generating a topological ordering for the data flow graph based at least in part on memory utilization of the process; generating a first modified topological ordering by inserting, into the topological ordering, one or more new nodes corresponding to memory access based on a predefined memory capacity; allocating units of memory in the memory based on the first modified topological ordering; and generating a second modified topological ordering by rearranging one or more nodes in the first modified topological ordering, wherein the second modified topological ordering enables increased parallel utilization of a plurality of hardware components.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
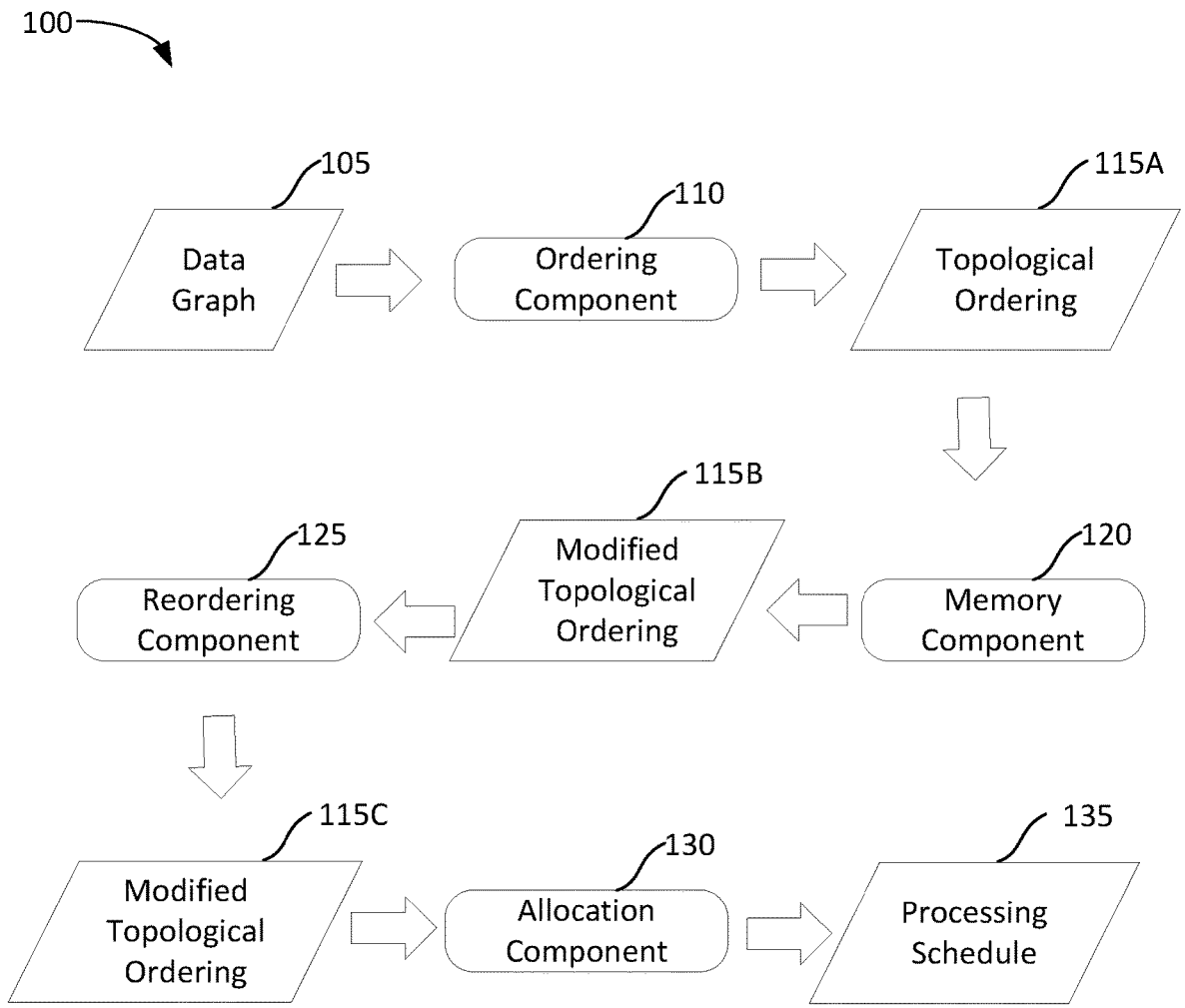
FIG. 1 depicts a workflow for improved process scheduling to ensure efficient execution of the process.

Aspects of the present disclosure provide apparatuses, methods, processing systems, and computer readable mediums for generating more efficient computer processing operation schedules using graph analysis to minimize memory utilization and improve the computational efficiency of executing the schedules.

Execution of many computing processes can be modeled using graphs where each node in the graph corresponds to a particular operation to be performed, and each edge corresponds to a flow of data among the operations.

For example, to execute a neural network, data can flow among any number of nodes for processing in order to generate a final output. In embodiments of the present disclosure, computing processes can be constructed as directed acyclic graphs (DAGs). A DAG is a directed graph that has no directed cycles (e.g., a graph with nodes and directed edges, where following the directed edges from node-to-node will never result in a closed loop). The "source" of a directed graph may generally refer to some upstream entity or component (just before the first node(s) of the graph) that provides any needed input data for the process, while the "target" is a downstream entity or component (just after the last node(s)) that receives any output from the process. To schedule execution of the process, embodiments of the present disclosure can generate a topological ordering (e.g., a linear ordering of nodes) based on the graph. Generally, a valid topological ordering must ensure that producer nodes (e.g., nodes that generate or otherwise output some data for downstream consumption) are scheduled and executed before any corresponding consumer nodes (e.g., nodes that receive, operate on, or are otherwise dependent on data generated by some upstream entity) begin execution. That is, if there is a directed edge from a first node (a producer) to a second node (a consumer), the first node must appear before the second node in the topological ordering. Notably, a given node may act as both a producer (for one or more downstream nodes) and a consumer (for one or more upstream nodes).

There are often a large number of valid topological orderings for any given graph. Finding an ordering to maximize any particular criteria or property is typically NP-hard. In some embodiments of the present disclosure, topological orderings are created to attempt to minimize storage accesses. By minimizing such storage accesses, the schedule can be executed with reduced latency and power consumption. In an embodiment, each node in the graph may output data that is consumed by zero or more subsequent nodes. Memory or storage is generally allocated (or used) when data is produced by a node, and freed (e.g., the memory space is made available) only when the last consumer completes its processing on the generated data. Thus, in some embodiments, a weighted directed graph is generated to reflect the node dependencies, where each edge corresponds to the units of memory required by the data.

For example, if a given (producer) node outputs 4 kilobytes of data to a consuming node, the edge between them may be assigned a weight of 4 kilobytes. This allows the system to quantify the total memory that will be needed at any given stage of execution.

Embodiments of the present disclosure provide techniques to generate and modify graphs using appropriate edge weighting to yield a valid topological ordering that seeks to minimize memory utilization in order to reduce the number of accesses to slower storage components. Additionally, embodiments of the present disclosure provide techniques to analyze and modify topological orderings to improve efficiency of the schedule.

In various embodiments, the efficiency gains can include, without limitation, reduced power consumption and latency, increased throughput of the system, and the like. In various embodiments, these scheduling improvements can be applied to improve the operations of a wide variety of processors and processes, including execution of machine learning models.

Minimum Cuts in Graphs

For a given graph, a cut is a set of edges that, if removed, disconnect the graph (e.g., partition the nodes into two disjoint subsets). As used herein, a minimum cut is a cut that minimizes the cost of the cut. In embodiments, the cost of a cut is defined as the sum of the weights of each edge that is severed or removed by the cut. Thus, a minimum cut is one that completely separates the graph into two disjoint subgraphs, while minimizing the total weight of the removed edges. For example, if a graph is partitioned by removing two edges, each with a weight of ten, the cost of the cut is twenty.

In the case of a directed graph, the cost of a given cut can be determined in part on the directionality of each removed edge and the directionality of the cut. Generally, edges that cross the cut in one direction (e.g., from left to right, in the case of a two dimensional graph) are included when computing the cost of the cut, while edges that cross the cut in the other direction are ignored.

A corollary to the concept of minimum cuts is maximum flow. The max-flow min-cut theorem states that the maximum amount of flow passing through a directed graph from the source to the target is equal to the total cost of the minimum cut. In some embodiments disclosed herein, edges in directed graphs are assigned weights based on the amount of data that flows across the edge. Any data that has been produced by a producer node but not yet consumed by a consumer node may be referred to as "in flight," and must be allocated space in memory. Thus, the weights of the edges in the graph indicate the amount of data that is "in flight" and therefore must have space allocated in memory for the producer/consumer set. Therefore, under the max-flow/min-cut theorem, by finding the minimum cut, the maximum amount of "in flight" data can be determined. That is, the cost of the minimum cut is the maximum amount of memory that will be needed at any one time to execute the operations in the graph.

Example Workflow for Improving Computer Process Scheduling

FIG. 1 depicts an example workflow 100 for improved process scheduling to ensure efficient execution of the process. In the illustrated workflow 100, a variety of components are depicted for conceptual clarity. In various embodiments, however, the functionality of each component may be combined or distributed across any number and variety of components. Additionally, the various components and operations may be performed in any order, including iteratively (e.g., a given component may be utilized multiple times in the workflow 100). The illustrated workflow 100 includes an Ordering Component 110, a Memory Component 120, a Reordering Component 125, and an Allocation Component 130. Each of these components may generally be implemented as a software process on a general purpose processor, using hardware, or as a combination of hardware and software.

As illustrated, the workflow 100 begins when a Data Graph 105 is received by an Ordering Component 110. In an embodiment, the Data Graph 105 is a directed graph reflecting the flow of data to accomplish a given process. In such an embodiment, each node in the Data Graph 105 may correspond to an operation (e.g., a transformation of data), while each edge may correspond to data being passed between operations.

For example, in one embodiment, the process corresponds to executing a machine learning model task, such as training or inferencing with an artificial neural network model. Although neural networks are used in some examples discussed herein, embodiments of the present disclosure are readily applicable to any data processing operation.

In an embodiment, each node in the Data Graph 105 may correspond to a neuron in a neural network, and the edges may correspond to the connections between such neurons. In order to process model input data (e.g., image data, sound data, sensor date, textual data, or other types of data) using the neural network, it is parsed and processed by the neurons sequentially, in parallel, or both. Thus, in an embodiment, the Data Graph 105 reflects this sequence of operations using a set of nodes with corresponding edges for the flow of data between neurons.

In some embodiments, the edges of the Data Graph 105 are weighted based on the data each edge corresponds to. In one embodiment, the weight of a given edge indicates the amount of data that is transmitted along the corresponding connection in the neural network. For example, if a first node passes ten kilobytes of data to a second node, the corresponding edge in the Data Graph 105 will have a weight of ten kilobytes. In this way, the Data Graph 105 quantifies the amount of data that is "in flight" at any given point during execution. In embodiments, when data is created or produced, space is required in memory to store it. This space is not freed until the last consumer of the data has finished its operations. Thus, the Data Graph 105 can be used to quantify the amount of memory needed at any given point in execution, by identifying producer-consumer sets that have begun (e.g., the producer has output data) but not yet terminated (e.g., the consumer(s) have not yet finished execution).

In the illustrated embodiment of FIG. 1, the Ordering Component 110 generates a Topological Ordering 115A based on the Data Graph 105. The Topological Ordering 115A is generally a linear sequence of operations (e.g., a sequence of nodes from the Data Graph 105) that respects the dependencies reflected in the graph. Thus, if a given node in the Data Graph 105 is completed before a second node, the given node will precede the second node in the Topological Ordering 115A. By stepping along the Topological Ordering 115A (executing each node in the indicated sequence), one can perform the original process (e.g., processing data using a machine learning model, such as a neural network model).

As discussed above, in some embodiments, there is a limited amount of local and/or relatively faster memory available in the system (e.g., faster to access than a host system memory that requires moving data over a common data bus). For example, a tightly-coupled memory (TCM) may act as a fast, local memory that is tightly-coupled to a processor. In various embodiments, this fast memory may include cache space, SRAM, and the like. Although such memory can be accessed quickly (due to its tight coupling with the processor(s)), the size of such fast memory is often limited owing to physical constraints and other design considerations for a processing system. In contrast, a relatively large amount of storage or memory may be available elsewhere in the host system (e.g., in typical RAM, hard drive or solid state drive devices, and the like). Execution of typical computing operations can be memory intensive, often exceeding the space available in local faster memory. Thus, while it is desirable to store the needed data in the local fast memory, it is often not possible to store all of this data simultaneously (due to its small size), which requires reliance on remote memories such as host system memory (e.g., DRAM).

In an embodiment, the Topological Ordering 115A is configured to reduce the amount of data that is stored at any given point in the process. Beneficially, this reduces the overall memory utilization, latency, and power during the process. In some embodiments, the Ordering Component 110 is configured to generate a set of minimum cuts, in order to generate the Topological Ordering 115A.

Generally, computing a minimum cut includes finding the smallest aggregate edge weights that disconnect the source of the graph from the target. As discussed above, the source of a graph (or subgraph) is a node or component that provides the input to the graph, while a target is a node or component that acts as the final sink or destination for data traversing the graph. By iteratively finding such minimum cuts, the Ordering Component 110 can generate the Topological Ordering 115A. In embodiments, the Ordering Component 110 may utilize any number of techniques for finding minimum cuts, including the Ford-Fulkerson algorithm, the Edmonds-Karp algorithm, and the like.

In the illustrated workflow 100, the Topological Ordering 115A is received by a Memory Component 120 that inserts memory operations into the ordering, as needed. In an embodiment, each memory operation corresponds to moving one or more units of data from the local memory (e.g., a TCM) into the remote memory or storage (e.g., DRAM), moving one or more units of data from the remote memory or storage into the local memory, or both. In some embodiments, such operations may be referred to as "spill/fill" operations. In other words, data may be spilled from a local memory to a remote memory, and later filled back into a local memory from the remote memory.

In an embodiment, the Memory Component 120 analyzes the Topological Ordering 115A to determine the amount of memory needed at each point in the ordering (e.g., at each node, or between each sequential node). In some embodiments, to do so, the Memory Component 120 determines the aggregate weight of all edges that are still "in flight" at each point (e.g., have left a producer node but not yet terminated at a consumer node).

For any points that exceed an available space in the local memory, the Memory Component 120 inserts one or more memory operations to move some data out of the faster memory into the remote memory. In this way, the Memory Component 120 generates a Modified Topological Ordering 115B, which is the original Topological Ordering 115A with zero or more memory operations inserted therein. Here it is zero or more because some Data Graphs 105 (e.g., those that require memory space that is smaller than or equal to the local memory) will not require any memory operations to the remote memory.

In the illustrated embodiment, this Modified Topological Ordering 115B is then provided to a Reordering Component 125. In an embodiment, the Reordering Component 125 can move nodes in the Modified Topological Ordering 115B (while respecting the data dependencies) in an effort to improve the potential for parallel processing in execution. In an embodiment, respecting data dependencies includes ensuring that no consumer node is placed before any of its producers in the Modified Topological Ordering 115B. For example, if a consumer is placed immediately after its producer, the consumer cannot be moved earlier in the ordering. If one or more nodes are located between a consumer and its producer in the Topological Ordering 115A, the consumer may be moved earlier in the ordering to create the Modified Topological Ordering 115B.

For example, in one embodiment, the Reordering Component 125 can move direct memory access (DMA) operations to earlier positions in the ordering to allow for them to occur in the background, being performed by one or more processing units, while the execution of the operations continues on one or more other processing units. That is, rather than initiate DMA just before the data is needed (e.g., by the next node), if sufficient space is available in the local memory, the Reordering Component 125 may move the DMA operation earlier to allow it to begin loading the data into the memory before it is needed. This increases parallel utilization of hardware components (e.g., while one processing unit loads the data, others may continue to operate on other data).

As another example, the Reordering Component 125 can modify the ordering of the nodes to improve parallel execution on discrete hardware processing units. In some embodiments, the system can include a number of processing units (e.g., one or more central processing units (CPUs), one or more graphics processing units (GPUs), one or more machine learning accelerators, such as neural processing units (NPUs), and the like). In such an embodiment, the Reordering Component 125 may further modify the Modified Topological Ordering 115B to allow some operations to be performed in parallel on the separate processing units. This results in a second Modified Topological Ordering 115C.

In the illustrated workflow 100, an Allocation Component 130 then processes the Modified Topological Ordering 115C to generate a Processing Schedule 135. Although depicted as being used as the last processing step in the workflow 100 (resulting in the generation of the Processing Schedule 135), in some embodiments, the Allocation Component 130 may be utilized at different steps in other workflows. Additionally, in some embodiments, one or more additional processes may be applied after the Allocation Component 130.

For example, in some embodiments, the Memory Component 120 can insert memory operations before the Allocation Component 130 operates. In some embodiments, however, it is only during allocation that one or more memory operations need to be inserted. In such an embodiment, therefore, the Memory Component 120 may analyze (or re-analyze) the ordering after allocation is performed.

In one embodiment, the Allocation Component 130 allocates units of memory (e.g., in a TCM) based on the Topological Ordering 115C. In embodiments, as discussed above, the Data Graph 105 and Topological Orderings 115 each include a collection of operations that use input data to produce output data. This data requires working memory while in use. Because the local memory space may be limited, in some embodiments, some memory locations must be reused. This is possible because some units of data are needed only for some subset of the process. For example, if data is produced by a producer node and consumed by a consumer node, the data need only be stored from the time of production to the time of consumption. Thus, each producer-consumer set spans a portion of the Topological Ordering 115C, beginning at the producer node and ending at the (last) consumer node. The Allocation Component 130 may allocate physical locations in the memory at each point in time for the data that is "live" at that point in the ordering.

Figure 10:
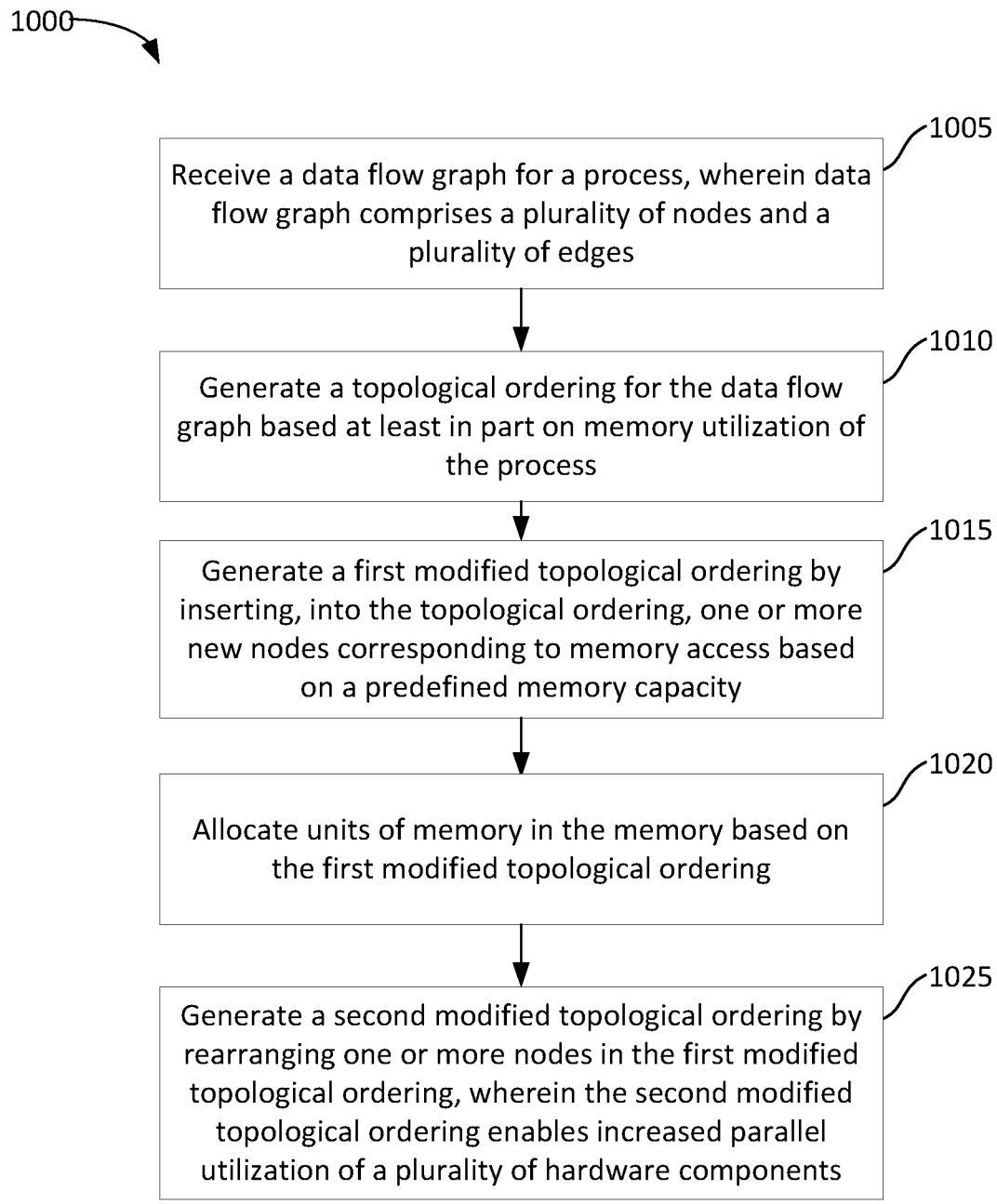
FIG. 10 depicts a flow diagram illustrating a method for generating and modifying topological orderings to improve process scheduling.
Figure 11:
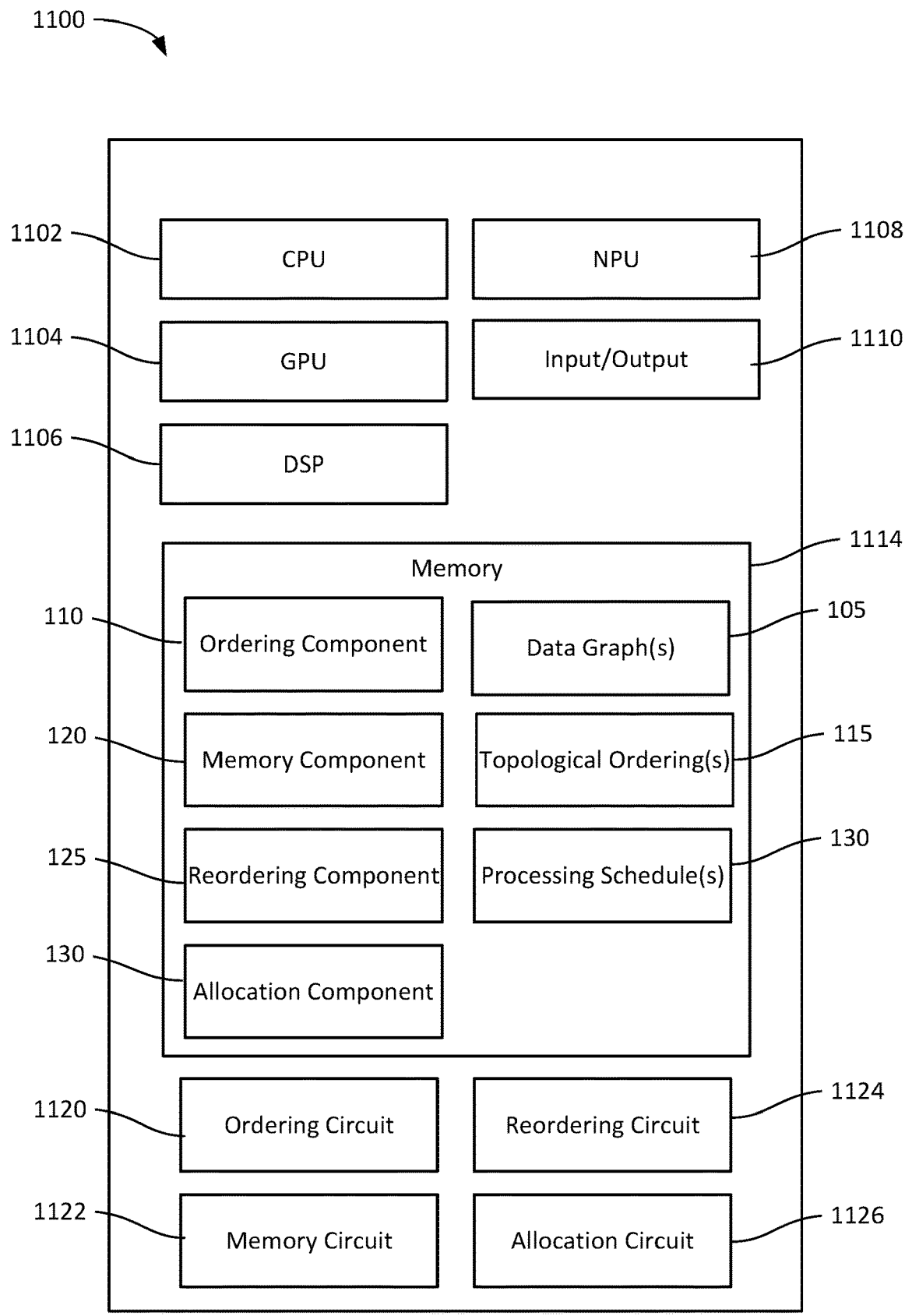
FIG. 11 depicts an example processing system, which may be configured to perform at least some of the methods described herein.

In embodiments, the Processing Schedule 135 can then be executed by one or more processing units of a processing system, such as described with respect to FIGS. 10 and 11, in order to perform the original process.

Example Graph Modifications for Improving Computer Process Scheduling

Figure 2A:
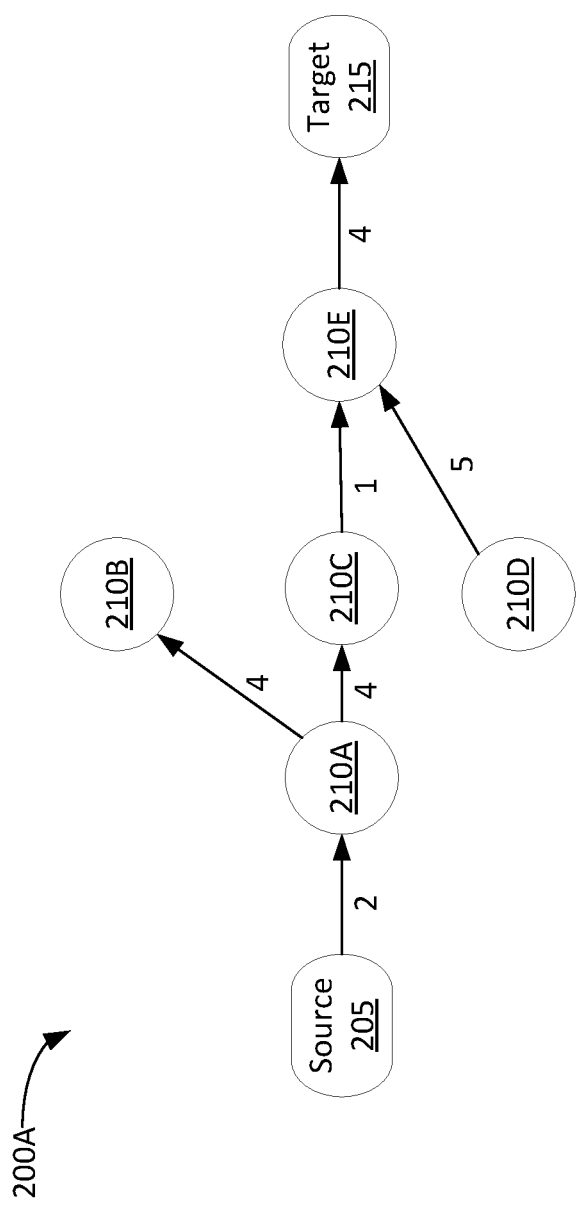
FIG. 2A depicts a graph illustrating a set of operations and corresponding data flow involved in executing a process.

FIG. 2A depicts an example graph 200A including a set of operations and corresponding data flows involved in executing a process. For example, the process may include a machine learning task, such as training or inferencing based on a machine learning model.

In the illustrated embodiment, data flows from a Source 205 to a Target 215 via a set of Nodes 210. In embodiments, each Node 210 performs some operation on incoming data, such as a mathematical operation, transformation, and the like. Further, each Node 210 may or may not output some data. In the illustrated embodiment, each edge is directed (indicated by the directionality of the arrow). Thus, each edge corresponds to data flowing from a producer node to a consumer node. In the depicted graph 200A, Node 210A receives two units of data from the Source 205, performs some operation, and outputs four units of data to Node 210B and to Node 210C. Node 210B does not output data and thus may be referred to as a data sink or leaf node.

As illustrated, Node 210C receives 4 units of data and outputs one unit of data to Node 210E. For example, Node 210C may perform a layer operation in a machine learning model in which data is compressed, such as a convolution layer or pooling layer.

Node 210E additionally receives five units of data from Node 210D. Based on this input, Node 210E outputs four units of data to the Target 215. Thus, in the illustrated embodiment, Node 210A is a "producer" node for two consumers: Nodes 210B and 210C. Node 210C is a producer for consumer Node 210E. Node 210D is also a producer for consumer Node 210E. In turn, Node 210E is a producer for the Target 215.

Although the graph 200A depicts a simple example process for conceptual clarity, in various embodiments the graphs may be significantly more complex.

Notably, not all sets of minimum cuts for a given the graph yield a valid ordering. For example, a set of minimum cuts may create an ordering that does not respect the data dependencies (indicated by the directionality of the edges). Similarly, when a given producer has multiple consumers, only the node which completes last can free the allocated data. To address these issues, a set of pre-processing operations can be performed to transform the graph 200A of FIG. 2A into a modified representation prior to generating the topological ordering.

Figure 2B:
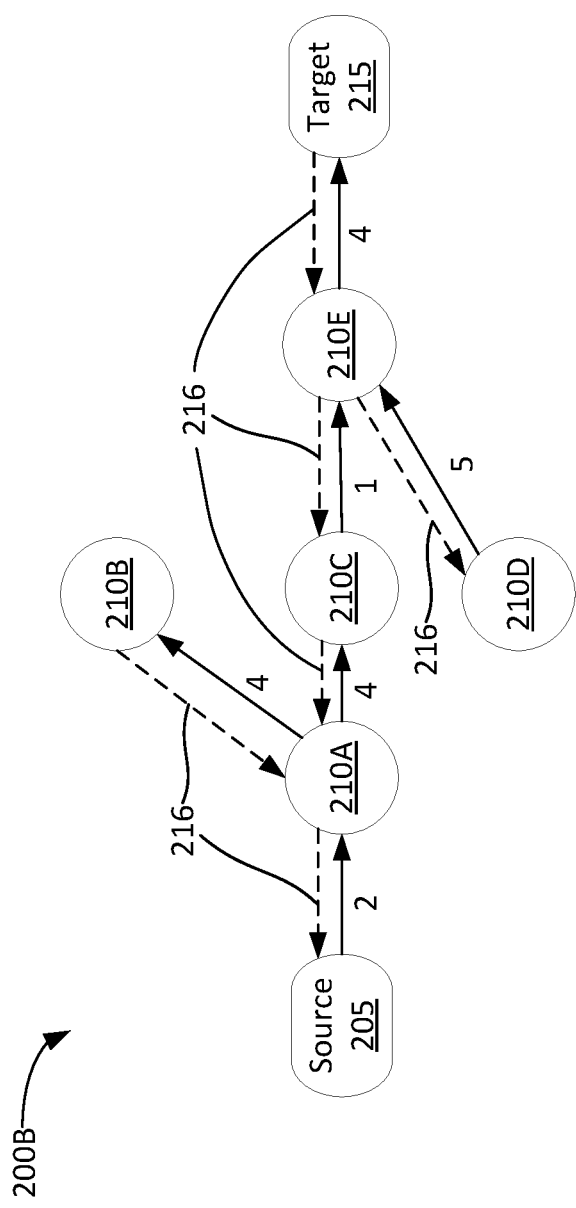
FIG. 2B depicts a reverse edge modification to create a modified graph.

FIG. 2B depicts a reverse edge modification to create a modified graph 200B. In the illustrated embodiment, this modification is performed by transforming the graph 200A. In one embodiment, the modification is performed by the Ordering Component 110 of FIG. 1. This graph 200B has one or more new edges inserted to ensure that the cuts yield a valid topological ordering. As discussed above, the concept of a minimum cut does not respect data dependencies, and will not necessarily result in a valid topological ordering (e.g., because the cut can curve back to cut an edge such that, from the perspective of the cut, the edge crosses backwards (e.g., from right to left) and therefore the weight is not included in the cost of the cut). In the illustrated embodiment, for each edge in the graph, a corresponding backwards or reverse edge (labeled 216) has been inserted. This is illustrated in FIG. 2B using dashed arrows. In an embodiment, these reverse edges are assigned a weight that ensures they will not be cut during the subsequent operations, as discussed in more detail below with respect to FIGS. 2C and 2D. That is, the backwards edges force the cut to respect data dependencies by being, in effect, uncuttable. For example, each backwards edge may be assigned an infinite weight.

Note that reverse edges are described in some examples herein as having "infinite" weights in order to ensure certain cuts will be prevented algorithmically. Generally, such edges may have arbitrarily high values. For example, because a truly infinite weight may be unworkable due to limitations of the physical hardware and software, the system may use a predefined value that significantly exceeds any realistic weight used in the system and is thus arbitrarily high. Generally, this predefined value may be selected to be larger than the costliest minimum cut, which ensures that it will never be included in a cut because cutting such a high weight, even alone, would incur more penalty than any alternative valid cut.

In some embodiments, this arbitrarily high predefined value is selected to be high enough that it exceeds reasonable or realistic weights, but low enough such that adding the weight of the infinite edge to weights of other edges would not cause integer overflow that could bring the weight back into the realm of reasonable weights. In other embodiments, the arbitrarily high value for reverse edges may be set based on one more values of forward edges in the graph, such as based on the largest forward edge weight, an average of forward edge weights, and the like, and such reference values may be modified by a coefficient or function to become arbitrarily high.

Figure 2C:
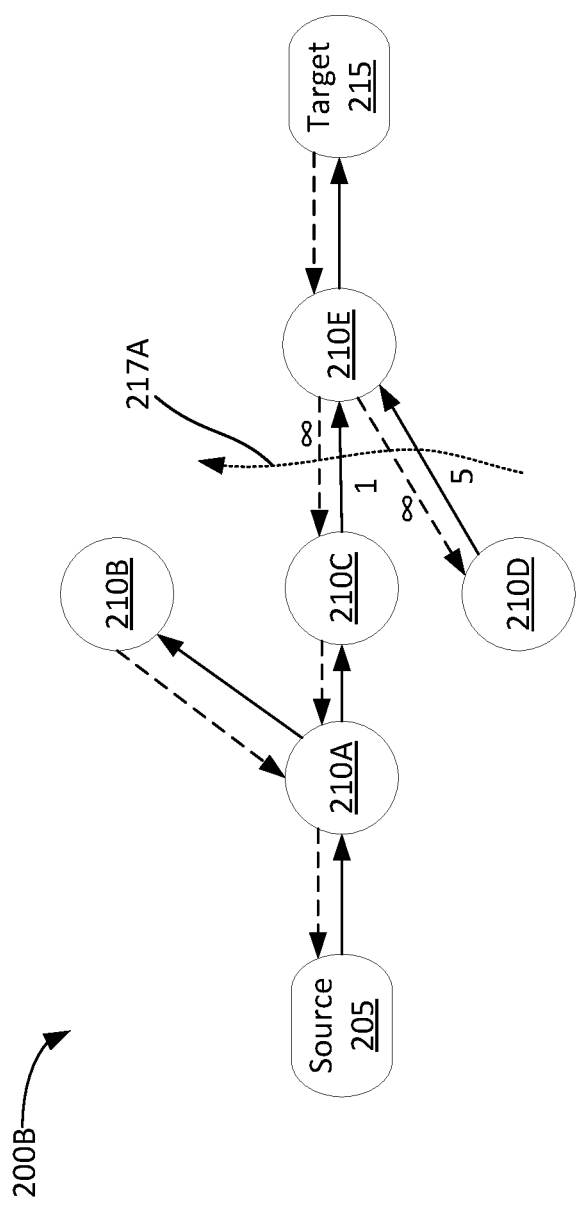
FIGS. 2C-2D depict cuts on a graph to partition the nodes into disjoint subsets.
Figure 2D:
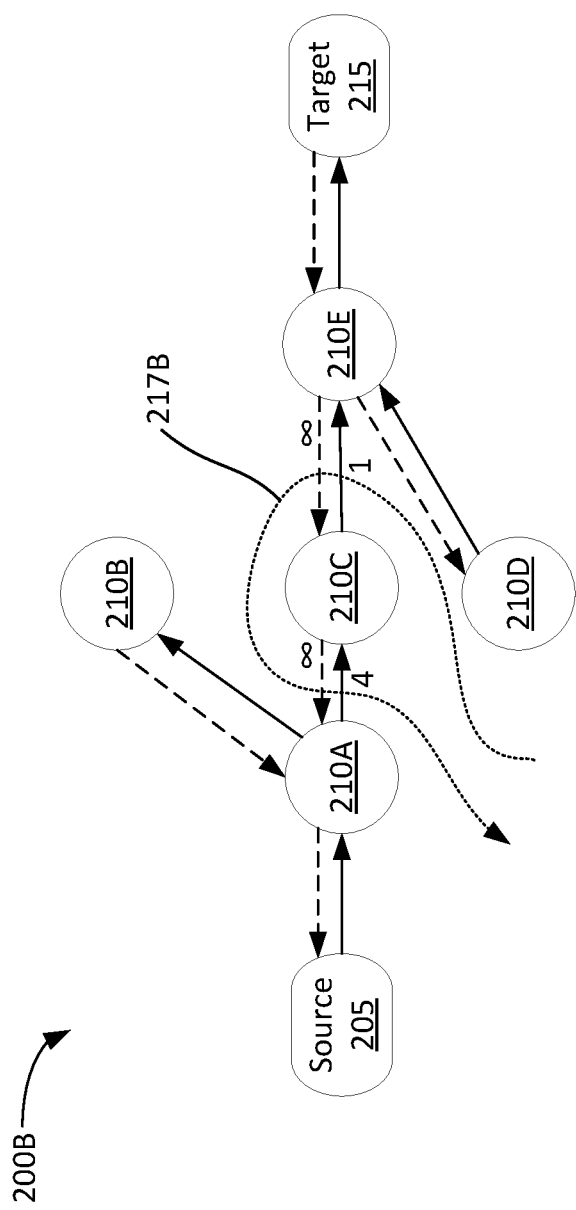

FIGS. 2C-2D depict cuts on a graph to partition the nodes into disjoint sub sets.

FIG. 2C depicts the graph 200B with a Cut 217A. In embodiments, a minimum cut can be conceptualized as a directed line that crosses a set of one or more edges in the graph to separate the source from the target. In the illustrated embodiment, the Cut 217A slices from bottom to top across the page. For each edge that passes through the Cut 217A in one direction (e.g., from the left of the cut through to the right in the illustrated embodiment), the weight of the edge is added to the cost of the cut. For each edge that passes in the other direction (from the right of the cut through to the left in the illustrated embodiment), the weight of the edge is ignored.

In the illustrated embodiment, the edge from Node 210D to Node 210E and the edge from Node 210C to 210E both cross the Cut 217A in the same direction, from the left to the right. Their weights are therefore included in the cost of the Cut 217A. In contrast, the two reverse edges from Node 210E to 210C and Node 210E to 210D cross the Cut 217A from the right to the left, and their weights are therefore ignored. Thus, the cost of the Cut 217A is six.

FIG. 2D depicts another Cut 217B. The edge from Node 210C to Node 210E crosses the Cut 217B from left to right, and is therefore counted when computing the cost of the Cut 217B. The infinite reverse edge from Node 210E to Node 210C crosses from right to left, and is therefore ignored. As illustrated, the edge from Node 210A to Node 210C crosses the Cut 217B from the right of the Cut 217B to the left of the Cut 217B (determined based on the directionality of the Cut 217B, indicated by the arrow head). Thus, this edge is ignored. In contrast, the infinite reverse edge from Node 210C to Node 210A crosses the Cut 217B from the left of the Cut 217B to the right of the Cut 217B. Thus, the (infinite) weight of this edge is included in the cost of the Cut 217B. This gives the Cut 217B (which may violate the topology of the original graph) an infinite cost, ensuring it will not be used to partition the graph 200B.

Thus, if no infinite (or high weight) edges are inserted, the minimum cut techniques may result in graphs that cut "backwards" across an edge and violate the dependencies. Inserting reverse edges ensures that the subsequently-generated cuts do not violate the topology: such a cut would incur infinite cost.

Figure 2E:
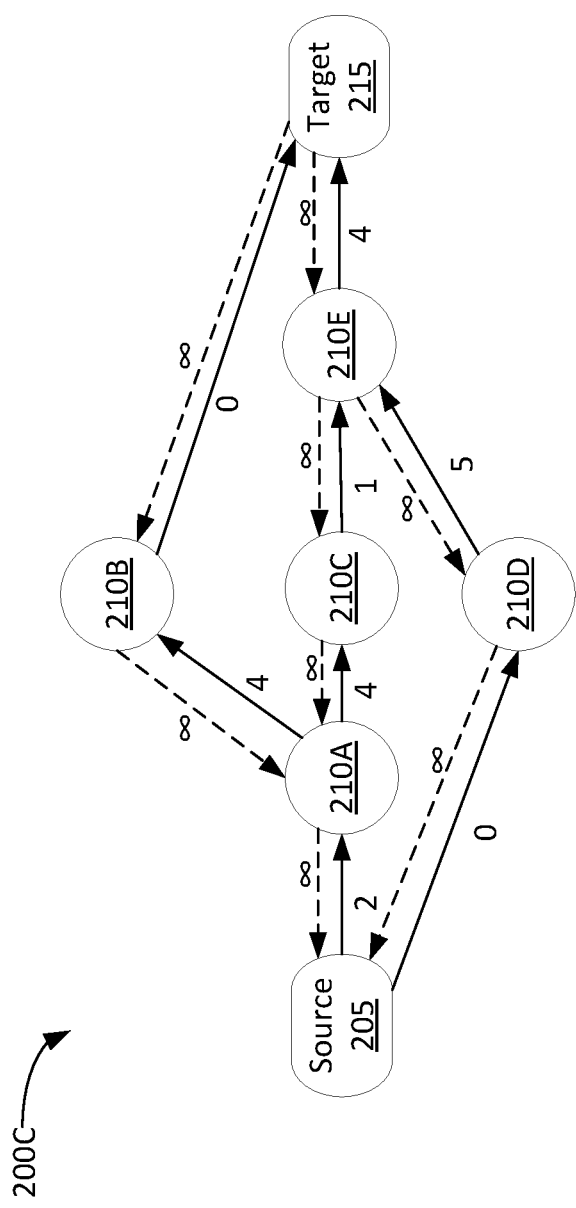
FIG. 2E depicts a full connection modification to create a modified graph.

FIG. 2E depicts a full connection modification to create a modified graph 200C. Specifically, the graph 200C reflects a modified version of the graph 200B, with additional edges inserted to enforce topological validity of the final ordering. A valid topological ordering (also referred to an ordering with topological validity) is one that respects the original dependencies of the graph, in that no consumer nodes are located before any of their producers. In the illustrated embodiment, this modification is performed to ensure that there is a path in the graph 200C from every Node 210 to the Target 215, and from the Source 205 to every Node 210. To do so, in the illustrated embodiment, zero-weight edges are inserted. Specifically, in graph 200B of FIG. 2B, no path existed to arrive at the Node 210D from the Source 205. By contrast, in graph 200C of FIG. 2E, a zero-weight edge has been inserted directly from the Source 205 to the Node 210D (e.g., Ordering by Component 110 of FIG. 1) and a corresponding infinite-weight reverse edge has been added.

Similarly, no path existed from the Node 210B to the Target 215 in graph 200B of FIG. 2B. To ensure topological validity, therefore, the Ordering Component 110 inserted a zero-weight edge connecting the Node 210B to the Target 215 (along with a corresponding infinite weight edge in reverse).

Figure 2F:
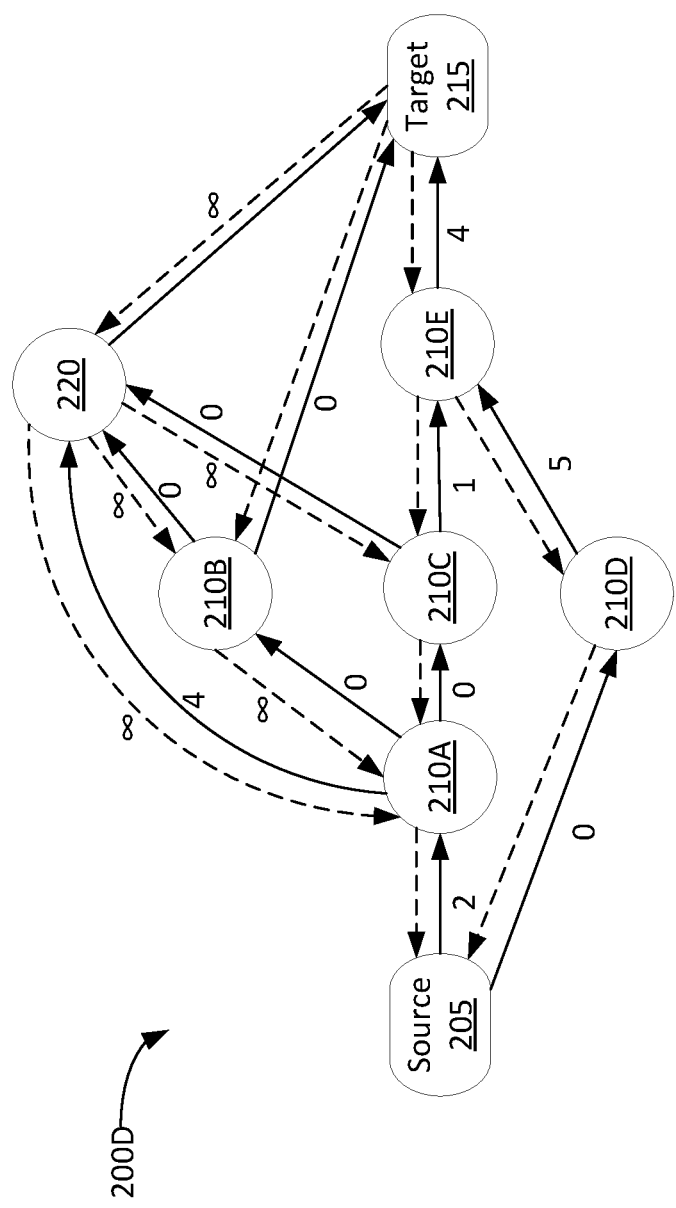
FIG. 2F depicts a deallocation modification to create a modified graph.

FIG. 2F depicts a deallocation modification to create a modified graph 200D. Graph 200D is based on the graph 200C of FIG. 2E and is configured to account for multiple consumer nodes. As discussed above, when a producer outputs data to one or more consumers, that data must be stored until all of the consumer(s) finish processing it. If a single consumer exists for the producer, the data can be deallocated as soon as the consumer completes. If multiple consumers exist, however, the data cannot be deallocated until all have completed their operations. In many embodiments, it may be difficult (or impossible) to know which consumer will complete last. Thus, in the illustrated embodiment, the Ordering Component 110 generates and inserts Deallocation Nodes 220 as needed. In embodiments, Deallocation Nodes 220 are placeholder nodes (e.g., nodes that do not perform any data operations or transformations, and exist to indicate when memory space can be deallocated or freed).

In one embodiment, the Ordering Component 110 inserts a Deallocation Node 220 for any producer node that has more than one consumer. Deallocation Nodes 220 are inserted to ensure that space in the local memory is not deallocated until all consumers of the data in that space have finished. If a producer node has a single consumer, the dependency reflected in the graph (e.g., the edge from the producer to the consumer) is sufficient to ensure that the consumer is scheduled after the producer. The space needed for the producer/consumer set is deallocated once the consumer finishes. However, if multiple consumers are present for a given producer, it is impossible to know when the space can be deallocated, as there is no dependency between the consumers that forces one to finish last. To ensure that the space is not deallocated prematurely, therefore, Deallocation Nodes 220 are used to signal when the space should be deallocated (only once all consumers have finished operating on the data).

In another embodiment, the Ordering Component 110 can simply insert a deallocation node for every producer, regardless of the number of consumers. As illustrated, inserting a Deallocation Node 220 for a given producer includes inserting an edge from each consumer of the producer to the Deallocation Node 220. In the illustrated embodiment, therefore, for the producer Node 210A, zero-weight edges are inserted from each of the consumers Node 210B and 210C to the Deallocation Node 220. As above, infinite-weight backwards edges are also added for each. This ensures that the Deallocation Node 220 is placed after both Nodes 210B and 210C in the topological ordering, and that the space is not deallocated until both have completed their operations.

In embodiments, the Ordering Component 110 also sets the weights of each original edge from the producer node to the consumers to zero. In the illustrated embodiment, this includes changing the weights of the edges from Node 210A to 210B and from Node 210A to 210C to zero. This is performed because if both edges retained their original weight, the data flowing on those edges would be "double counted" while computing minimum cuts, resulting in inaccuracies and inefficiencies in the final schedule.

To quantify the weight of these edges and ensure they are counted in the final ordering, the Ordering Component 110 can additionally insert an edge from the producer Node 210A to the Deallocation Node 220. This edge is assigned a weight that corresponds to the original edges from the producer to the consumer(s). Additionally, as illustrated, this new edge is similarly accompanied by an infinite backwards edge to enforce topological validity.

In embodiments, the Ordering Component 110 can then process the graph 200D using maximum flow/minimum cut techniques in order to generate a valid topological ordering for the original graph 200A. Additionally, by utilizing the edge weights (corresponding to the amount of data needed for each producer/consumer set), the minimum cuts are computed based on memory utilization and attempt to use the minimum amount of memory at each stage of the execution.

Example Minimum Cut Procedures for Improving Computer Process Scheduling

FIGS. 3A-3D depict a sequence of evaluations and operations performed to generate a valid topological ordering of a data flow graph to improve scheduling of the corresponding process. Specifically, FIGS. 3A-3D depict a sequence of minimum cuts computed by an ordering component (e.g., Ordering Component 110 of FIG. 1) in order to generate a topological ordering.

Figure 3A:
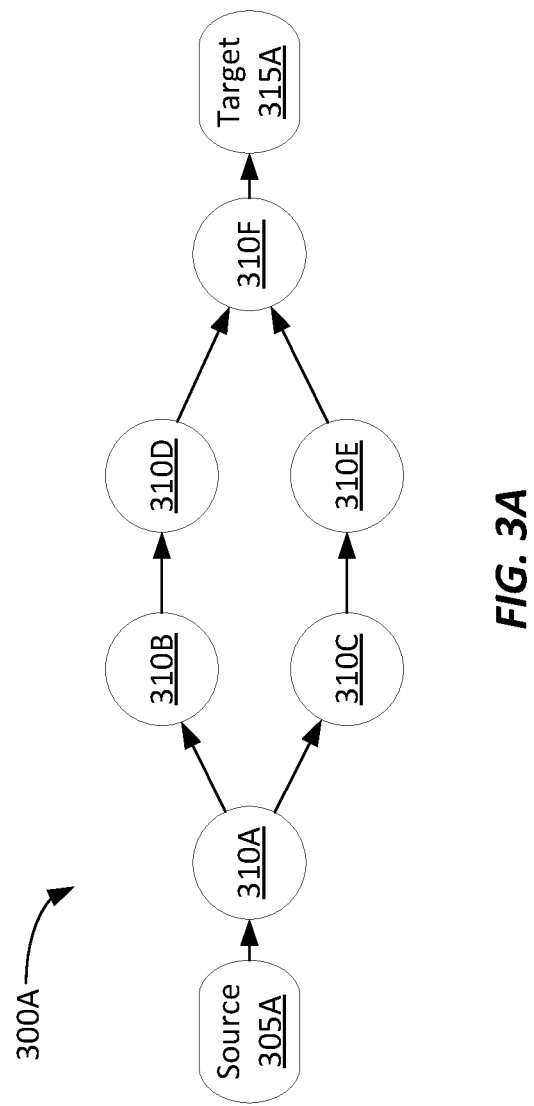
FIGS. 3A-3D depict a sequence of evaluations and operations performed to efficiently generate a valid topological ordering of a data flow graph to improve scheduling of the corresponding process.

FIG. 3A depicts an initial graph 300A before cuts are generated. In the illustrated graph, data flows from a Source 305A to a Target 315A via a set of Nodes 310. Specifically, Node 310A receives data from Source 305A and transmits data to Nodes 310B and 310C. Node 310B in turn provides data to Node 310D, and Node 310C provides data to Node 310E. Node 310F receives data from both Node 310D and Node 310E. Node 310F then provides data to the Target 315A.

Figure 3B:
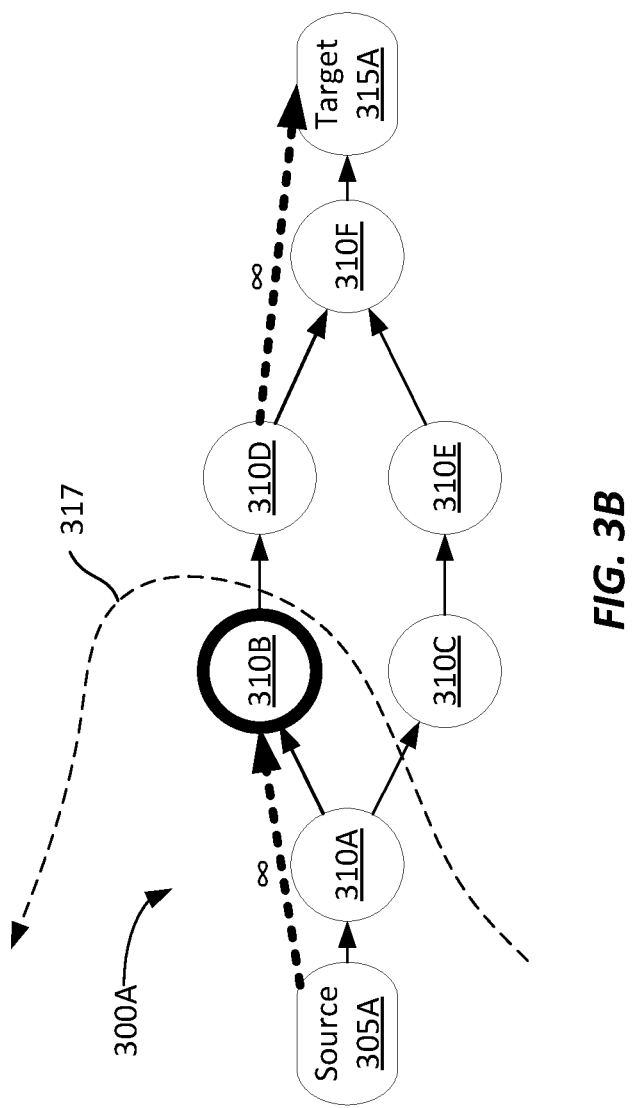

FIG. 3B depicts a first Cut 317 in the graph 300A. In embodiments, the minimum cut technique yields a single cut for a graph. To generate a topological ordering, the ordering component can select a node to serve as an "index node" for a given cut, and constrain the cut to pass just after the index node. This allows the ordering component to exert some control over where the cut is placed, to help improve the efficiency and latency of the cutting process. For example, if the cuts are not constrained, the minimum cut for a given graph is likely to be a single edge near the beginning or end of the graph. Cutting here, however, is not useful in generating a topological ordering, because this portion of the graph is already linear. That is, if a single edge connects node A to node B, there is no possible ordering that places the node B before node A. Generating a cut at this point, therefore, is useless.

In some embodiments, to constrain the cut to an index node, the Ordering Component 110 selects an index node, computes a cut to divide the graph into two sub-graphs, and then processes each sub-graph to compute another cut for each. By iteratively processing each sub-graph, a topological ordering is generated. In embodiments, a topological ordering is a linear sequence of nodes. There may be multiple valid topological orderings for a given graph. By iteratively processing each subgraph to subdivide each into additional subgraphs, the ordering component iteratively makes the overall graph more linear. That is, each cut effectively enforces some linearity by placing some nodes before the cut and some nodes after. By iteratively computing cuts, the graph becomes more linear.

In one embodiment, this process repeats until all subgraphs are linear (or all subgraphs include a single node). In another embodiment, rather than computing cuts until the subgraphs are linear (or contain a single node), the processing system can proceed until each subgraph has reached some predefined criteria relating to size or complexity (e.g., a number of nodes in the subgraph). These subgraphs may then be transformed using one or more techniques to generate topological orderings for the subgraph.

In an embodiment, the final topological ordering is created by reconnecting each subgraph, in the proper order, where the cuts were made (e.g., by adding or reconnecting the edges that were severed, while maintaining the linear sequence of nodes).

In the illustrated embodiment, the Ordering Component 110 has selected the Node 310B to serve as the index node for the first Cut 317. In some embodiments, the Ordering Component 110 selects the index node randomly. In at least one embodiment, the Ordering Component 110 attempts to select an index node that is near the center of the graph 300A based on the depth of each node.

In one embodiment, the Ordering Component 110 determines the depth of each respective Node 310 based on its distance from both the Source 305A and the Target 315A. For example, for each respective Node 310, the Ordering Component 110 may count the number of nodes or edges that precede it (e.g., that must be traversed to get from the source to the node) and the number of nodes or edges that are subsequent to it (e.g., that must be traversed to get from the node to the target). By aggregating these counts (e.g., through addition or multiplication), the Ordering Component 110 can identify the node (or set of nodes) located nearest to the center of the graph 300A. In an embodiment, the node with the highest aggregate depth from source and target is referred to as a "centroid" node. Although generally located near the center, in embodiments, the centroid node may of course not be precisely centered in the graph.

In one embodiment, if multiple nodes have the same depth score, the Ordering Component 110 can randomly select among them to select the index node. In at least one embodiment, if two nodes are at the same depth and have the same operation type, the Ordering Component 110 treats them as sibling nodes. Sibling nodes generally correspond to a single node which was split into a set of siblings, each performing the same operation. Sibling nodes may be generated to enhance processing parallelism. In an embodiment, to select among such siblings, the Ordering Component 110 constrains the cut after the middle node of the siblings, such that half of the siblings complete before the index node runs, and half complete after. In one embodiment, to identify the middle sibling, the ordering component traverses one edge upstream in the graph, then one edge back down to a sibling. This repeats until all siblings are found.

Typically, a minimum cut technique will place the cut to bisect the graph 300A in a location that minimizes the weight of the edges it cuts through. In order to constrain the cut to occur just after the selected index node (e.g., Node 310B), the Ordering Component 110 may add additional edges to the graph. In the illustrated embodiment, the Ordering Component 110 adds an edge with infinite weight from the Source 305A to the index Node 310B. The Ordering Component 110 additionally adds an edge with infinite weight from each consumer of the index node (Node 310D in the illustrated embodiment) to the Target 315A. This ensures that the computed cut will pass just after the index node and before any consumers of the index node.

In the illustrated embodiment, the resulting Cut 317 separates the index Node 310B and its consumer Node 310D. As illustrated, to bisect the graph 300A and disconnect the Source 305A from the Target 315A, the Cut 317 also cuts through the edge between Node 310A and Node 310C. Of course, in embodiments, the Cut 317 could instead have cut between Nodes 310C and 310E, between Nodes 310E and 310F, or between Node 310D and 310F (continuing through the edge between Node 310F and 315A).

In embodiments, the particular path of the cut (e.g., the edges it severs) is chosen to minimize the aggregate/accumulated weight of the severed edges. The Cut 317 must bifurcate the edge between Nodes 310B and 310D (because of the edges added by the Ordering Component 110). The Ordering Component 110 will then route the Cut 317 through other edge(s) as needed to completely separate the graph 300A, while minimizing the total cost. Each time the Cut 317 passes through an edge, the weight of the edge is added to the total cost (also referred to as a penalty) of the cut. Notably, the total cost of the Cut 317 reflects the total amount of data that is maintained in memory at the corresponding point of the cut.

The Cut 317 bifurcates the graph 300A, such that some portion of the graph 300A is performed prior to the Cut 317, and some portion occurs after the Cut 317. In the illustrated embodiment, Nodes 310A and 310B precede the Cut 317 (along with the Source 305A), while Nodes 310C-F are subsequent to it (along with the Target 315A).

Figure 3C:
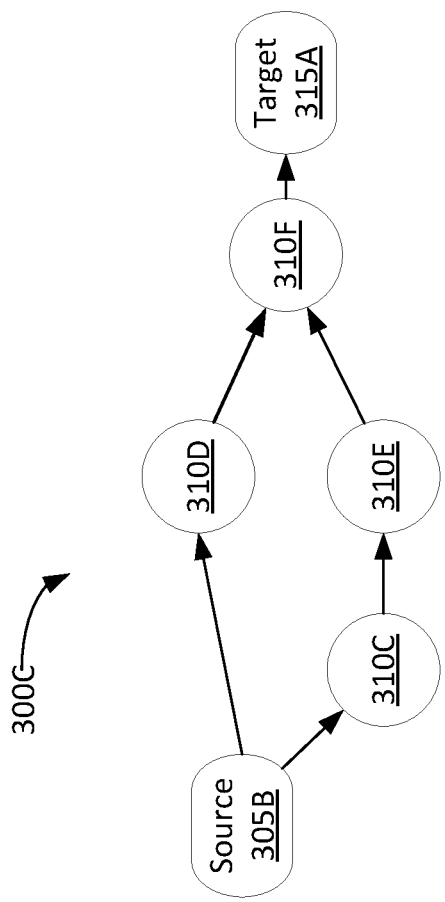
Figure 3C:
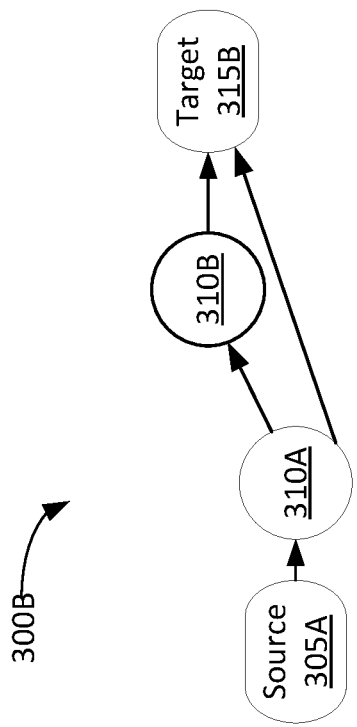

FIG. 3C depicts the result of the Cut 317. Specifically, as illustrated, all elements on one side of the Cut 317 have been placed in a first subgraph 300B, while all elements on the other side belong to a second subgraph 300C. Additionally, as illustrated, a new Target 315B has been inserted into the subgraph 300B to provide a new target for the subgraph. In some embodiments, for each edge that was cut by the Cut 317, a new edge is added to the new Target 315B, in order to preserve and enforce the dependencies in the original graph 300A.

Similarly, in the subgraph 300C, a new Source 305B has been added. Additionally, as illustrated, for each edge that the Cut 317 severed, a new edge has been added from the new Source 305B to enforce the dependencies of the original graph 300A.

Figure 3D:
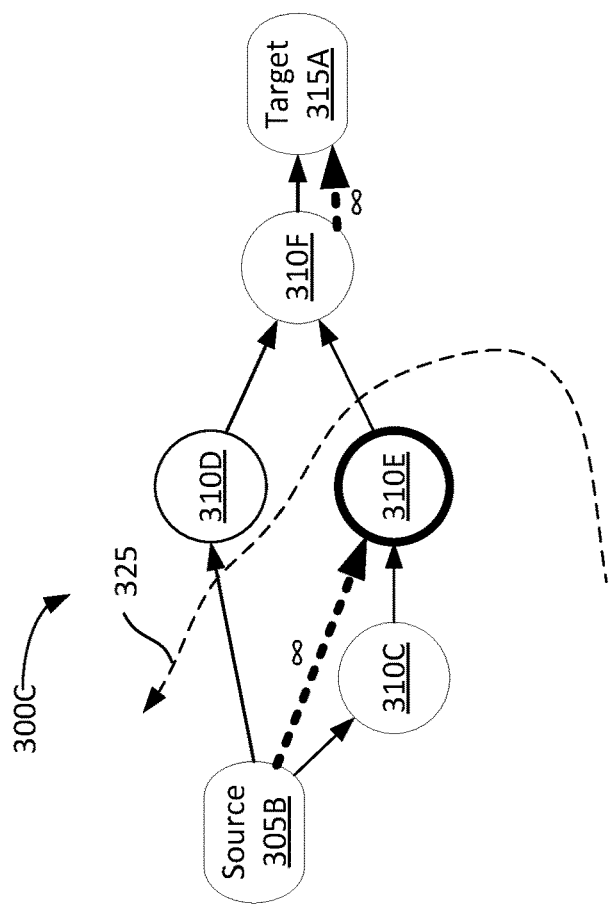
Figure 3D:
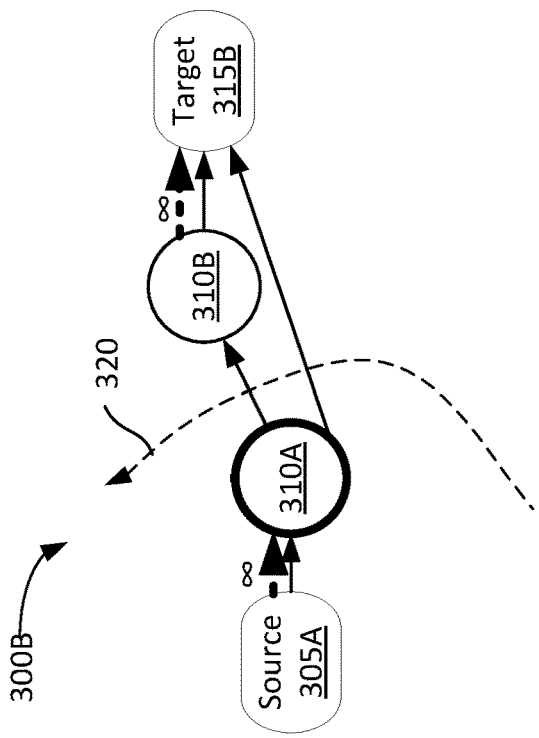

FIG. 3D depicts additional Cuts 320 and 325 generated by the Ordering Component 110 for the subgraphs 300B and 300C, respectively. In the subgraph 300B, the Ordering Component 110 has selected the Node 310A as the index node. To constrain the Cut 320 to occur just after this Node 310A, as illustrated, the Ordering Component 110 inserts infinite-weight edges from the Source 305A to the index Node 310A, and from all consumers of the index node (e.g., from consumer Node 310B) to the new Target 315B.

Similarly, in subgraph 300C, the Ordering Component 110 has selected Node 310E to serve as the index node. To constrain the Cut 325, the Ordering Component 110 has inserted an infinite edge from the new Source 305B to the index Node 310E, and an infinite edge from each consumer of the index node (here, Node 310F) to the Target 315A.

As discussed above, Cuts 320 and 325 bifurcate each subgraph 300B and 300C into two new subgraphs (yielding four subgraphs in total). In some embodiments, the Ordering Component 110 can perform similar processing for each subgraph iteratively until some terminating criteria (e.g., a maximum number of iterations, or a maximum time spent finding the cuts) has been satisfied. That is, the Ordering Component 110 may compute a cut to divide a graph into two subgraphs. For each subgraph, the Ordering Component 110 can then compute another cut to divide each subgraph into two more subgraphs (yielding four subgraphs total). For each of these four subgraphs, the Ordering Component 110 may similarly compute a cut to yield eight total subgraphs.

In one embodiment, the Ordering Component 110 selects the next subgraph to be divided based on the size of each subgraph. Although selecting a centroid node can help balance the subgraphs, the resulting cut can be significantly uneven (with more nodes on one side than the other). In some embodiments, the Ordering Component 110 selects the largest of the available subgraphs to compute the next cut. This iterative process repeats until the predefined criteria are met. By iteratively selecting and cutting the largest subgraph, the ordering component can compute minimum cuts at the denser or more complex regions of the graph first, followed by the less dense or complex regions. This results in a more efficient topological ordering, and reduces the time needed to find final the set of cuts.

In one embodiment, the terminating criteria relate to a full topological ordering. For example, the Ordering Component 110 may continue to iteratively cut each subgraph until the nodes in a given subgraph are linear. When a subgraph is linear, no additional cuts are required to yield a topological ordering. Once all subgraphs are linear, they may then be combined (e.g., by linking the subgraphs together at the places where they were cut) to form the full topological ordering. In some embodiments, the terminating criteria may include a number of iterations or cuts to be computed. Once the number of iterations has been reached, the process stops. In some embodiments, the terminating criteria includes a time bound. When the predefined amount of time has been spent, the cutting process stops.

Example Method for Process Scheduling

Figure 4:
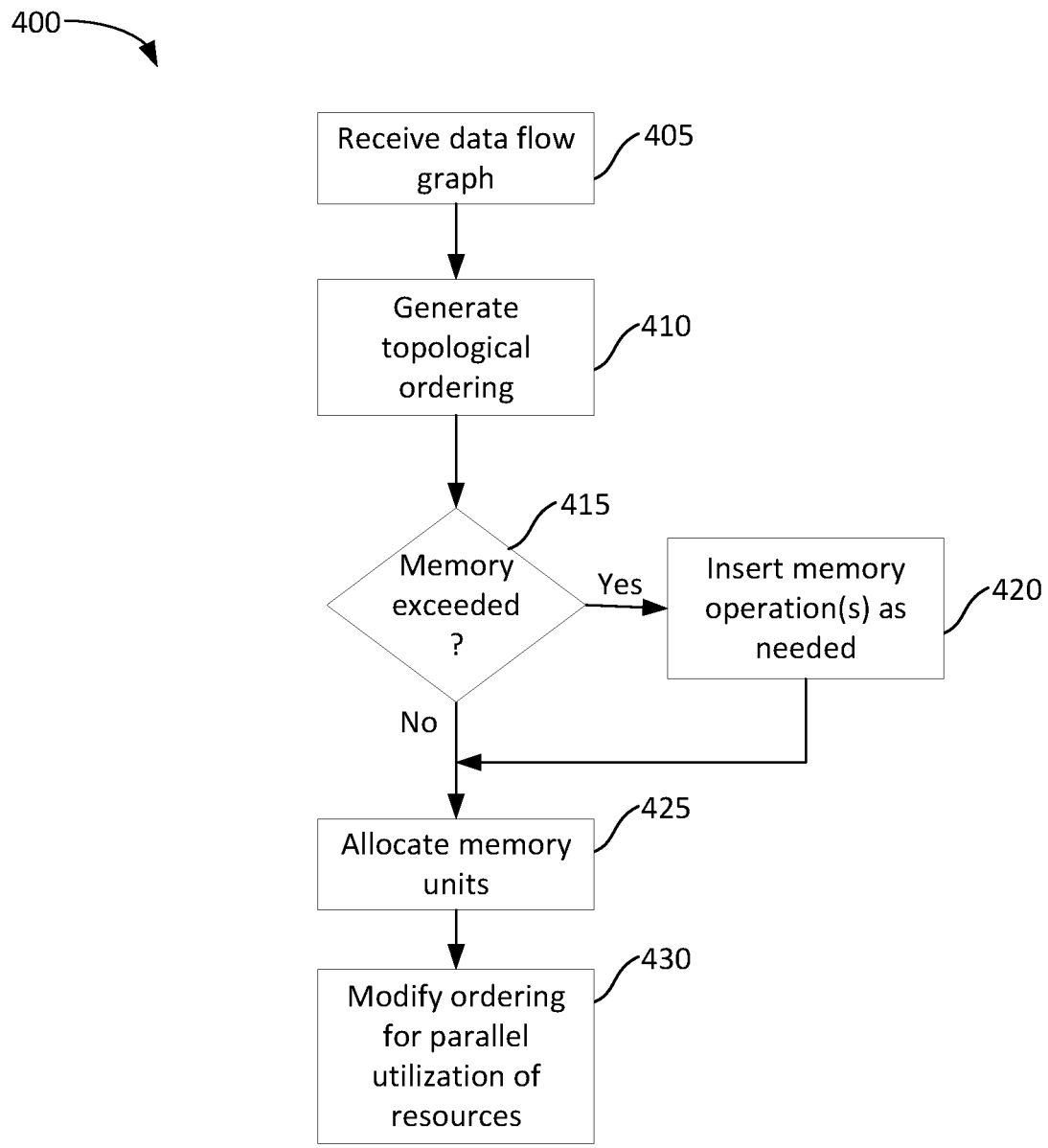
FIG. 4 depicts a flow diagram illustrating a method for improved process scheduling.

FIG. 4 depicts a flow diagram illustrating a method 400 for improved scheduling of computer processing operations.

In some embodiments, the method 400 is performed by a processing system, such as described with respect to FIG. 10, including one or more components, such as an Ordering Component 110, a Memory Component 120, a Reordering Component 125, an Allocation Component 130, and the like.

The method 400 begins at block 405, where a data flow graph is received for processing. In an embodiment, as discussed above, this data flow graph generally corresponds to some computing process, where each node corresponds to an operation performed during the process and each (directed) edge corresponds to data flow in the process. In some embodiments, the weight of each edge in the data flow graph corresponds to the amount of data that is passed along the dependency and is therefore required to be allocated space in memory.

At block 410, the processing system generates a topological ordering for the received data flow graph. In one embodiment, this process includes some or all of the steps illustrated and discussed above with reference to FIGS. 2A-2D and 3A-3D.

The method 400 then proceeds to block 415, where the processing system determines whether an available space in memory (e.g., in local memory) will be exceeded by the topological ordering at any point. That is, the processing system can determine whether the memory needed (indicated by the aggregate weight of the edges at any point in the ordering) exceeds the available space in the memory (e.g., in the TCM). If so, the method 400 continues to block 420.

At block 420, the processing system inserts one or more memory operations (e.g., spill/fill operations) into the topological ordering. In an embodiment, for each point where the needed space (indicated by the weight of the edges at each point) exceeds the available space in local memory, the processing system inserts memory operation(s) to move some data out of the local memory and into more remote memory to ensure the local memory capacity is not exceeded. The method 400 then continues to block 425. The processing system may similarly insert operations to move the data back into memory when needed.

Additionally, at block 415, if the processing system determines that no point in the ordering will require more space than is available in local memory, the method 400 continues to block 425.

At block 425, the processing system allocates units of memory based on the topological ordering. As discussed above, in some embodiments, this includes assigning addresses in the memory to each piece of data at each point in time.

Figure 5:
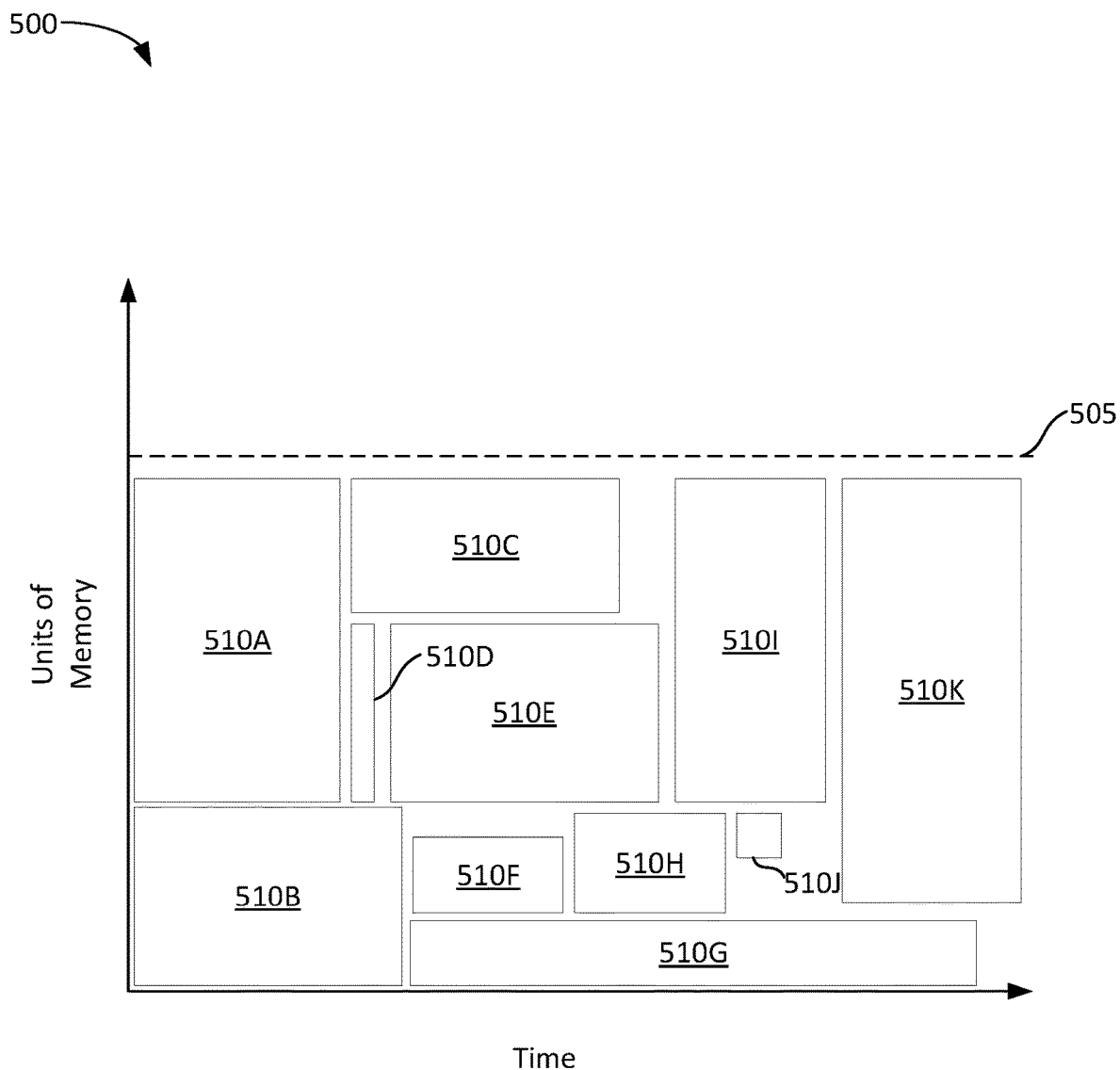
FIG. 5 depicts a visualization of memory allocations, according to some embodiments disclosed herein.

FIG. 5 depicts a visualization of memory allocations, according to some embodiments disclosed herein. In the illustrated embodiment, allocations are plotted on a graph 500 where the horizontal axis is time and the vertical axis is units of memory in the local memory. In an embodiment, each Allocation 510 (e.g., to a producer-consumer or producer-consumers set) is depicted as a rectangle that spans horizontally from a time when the producer node produces the data to a time when the final consumer node consumes it. The height of each Allocation 510 corresponds to the amount of data needed for the producer-consumer set. In an embodiment, the processing system allocates memory by assigning units of memory in an effort to pack such rectangles as tightly as possible, without exceeding some predefined value on the vertical axis (corresponding to the available space of the local memory, indicated by the dashed line 505). If any Allocations 510 pass this line 505, some data must be moved to the remote (host) memory, and the corresponding space in the local memory is deallocated (allowing it to be re-allocated to other producer/consumer sets).

In the illustrated embodiment, the allocations indicate the time when each producer and consumer can operate. For example, the producer associated with the Allocation 510F has space allocated after the consumer associated with the Allocation 510B has completed. Thus, the producer of Allocation 510F cannot begin until the consumer of Allocation 510B completes.

Returning to FIG. 4, once the memory has been allocated, in the illustrated embodiment, the method 400 continues to block 430, where the processing system modifies the ordering of the nodes in the topological ordering in order to increase parallel utilization of resources. In various embodiments, this can include, for example, moving load operations (e.g., moving data from storage to memory) to earlier positions in the ordering, rearranging nodes to allow for parallel execution on separate processing units, and the like.

Example Method for Generating Topological Orderings

Figure 6:
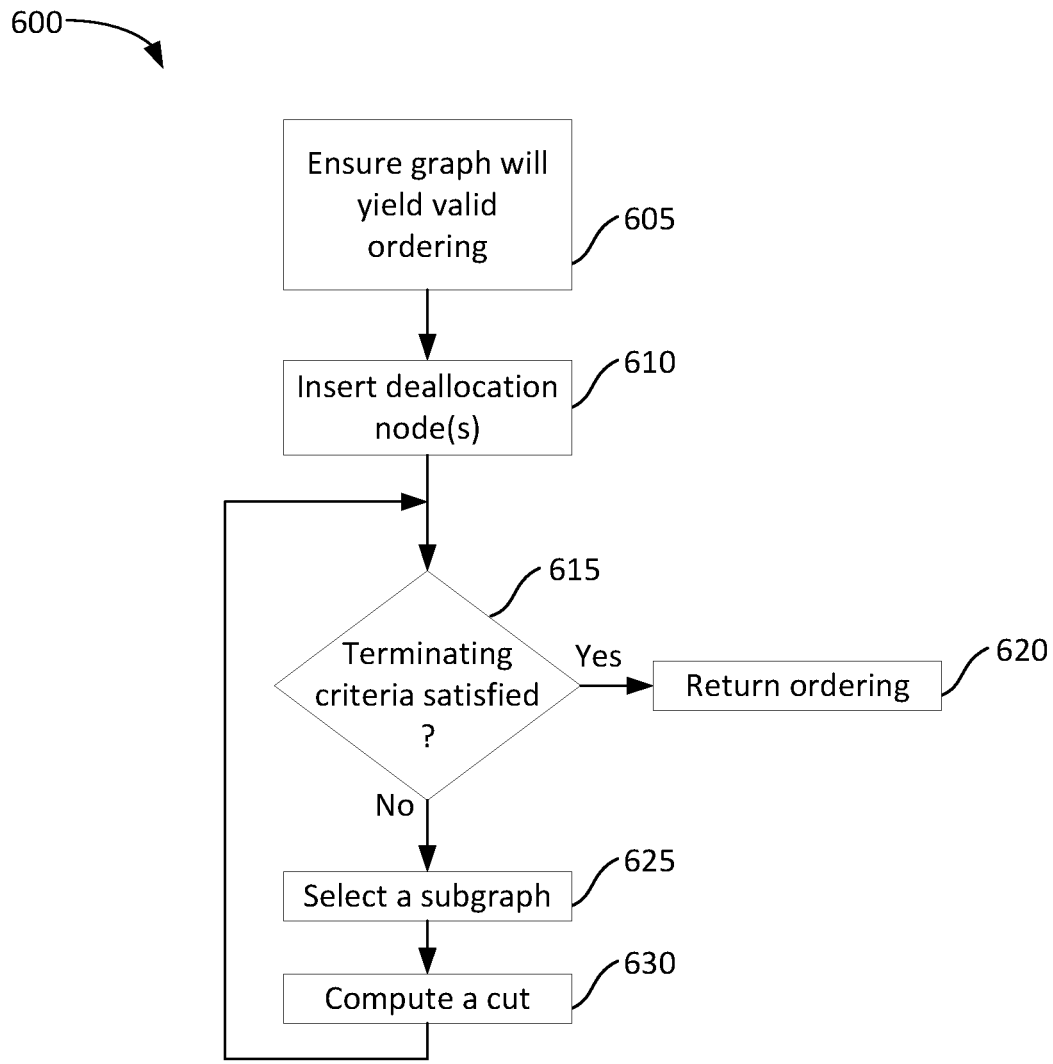
FIG. 6 depicts a flow diagram illustrating a method for generating topological orderings to improve process scheduling.

FIG. 6 depicts a flow diagram illustrating a method 600 for generating topological orderings to improve process scheduling.

In one embodiment, the method 600 provides additional detail for block 410 in FIG. 4 (generating a topological ordering).

The method 600 begins at block 605, where the processing system performs one or more operations to ensure that the cuts will result in a valid topological ordering (e.g., an ordering that respects the original dependencies). As discussed above, this may include, for example, adding reverse edges with high or infinite weights (to prevent the cut from crossing an edge backwards and violating a dependency).

The method 600 then continues to block 610, where the processing system inserts zero or more deallocation nodes into the graph, as needed. In one embodiment, as discussed above, the deallocation nodes can be utilized to ensure that producers with multiple consumer nodes are processed correctly by the minimum cut algorithm(s).

At block 615, a loop is initiated to generate a set of minimum cuts. At block 615, the processing system determines whether predefined termination criteria are satisfied.

In one embodiment, the terminating criteria includes determining whether the graph (or each subgraph) is linear. If so, the method 600 continues to block 620, where the processing system returns this linear topological ordering. In various embodiments, the termination criteria can include, for example, a maximum time, a maximum number of cuts or iterations, and the like.

If the terminating criteria are not satisfied, the method 600 continues to block 625, where the processing system selects a subgraph. In an embodiment, during the first iteration of the loop, the processing system operates on the entire graph. In each subsequent iteration, block 625 can include selecting the next subgraph to be operated on. In one embodiment, the processing system selects the largest of the remaining (non-linear) subgraphs.

The method 600 then continues to block 630, where the processing system computes a minimum cut for the selected subgraph (or the original graph, for the first iteration). In some embodiments, to compute the cut, the processing system first selects an index node to constrain the cut. That is, the processing system ensure that the cut separates the index node from all of its consumers. Selecting index nodes near the center of the graph can allow the processing system to process the complex portions of the graph first, rather than cutting off single nodes, which ensures that the iterative process is rapid and efficient, and results in a final ordering that accounts for the global graph structure (as opposed to individual local portions thereof).

In some embodiments, computing the cut comprises selecting a set of edges to remove in order to completely separate the source and the target nodes while minimizing the total cost of the cut. The cost of any given cut is determined based on aggregating (e.g., adding) the individual weights of each edge that the cut crosses.

The method 600 then returns to block 615. In this way, the processing system continues to iteratively evaluate and cut each subgraph until the terminating criteria are satisfied.

Example Method for Modifying Graphs to Enforce Topological Validity

Figure 7:
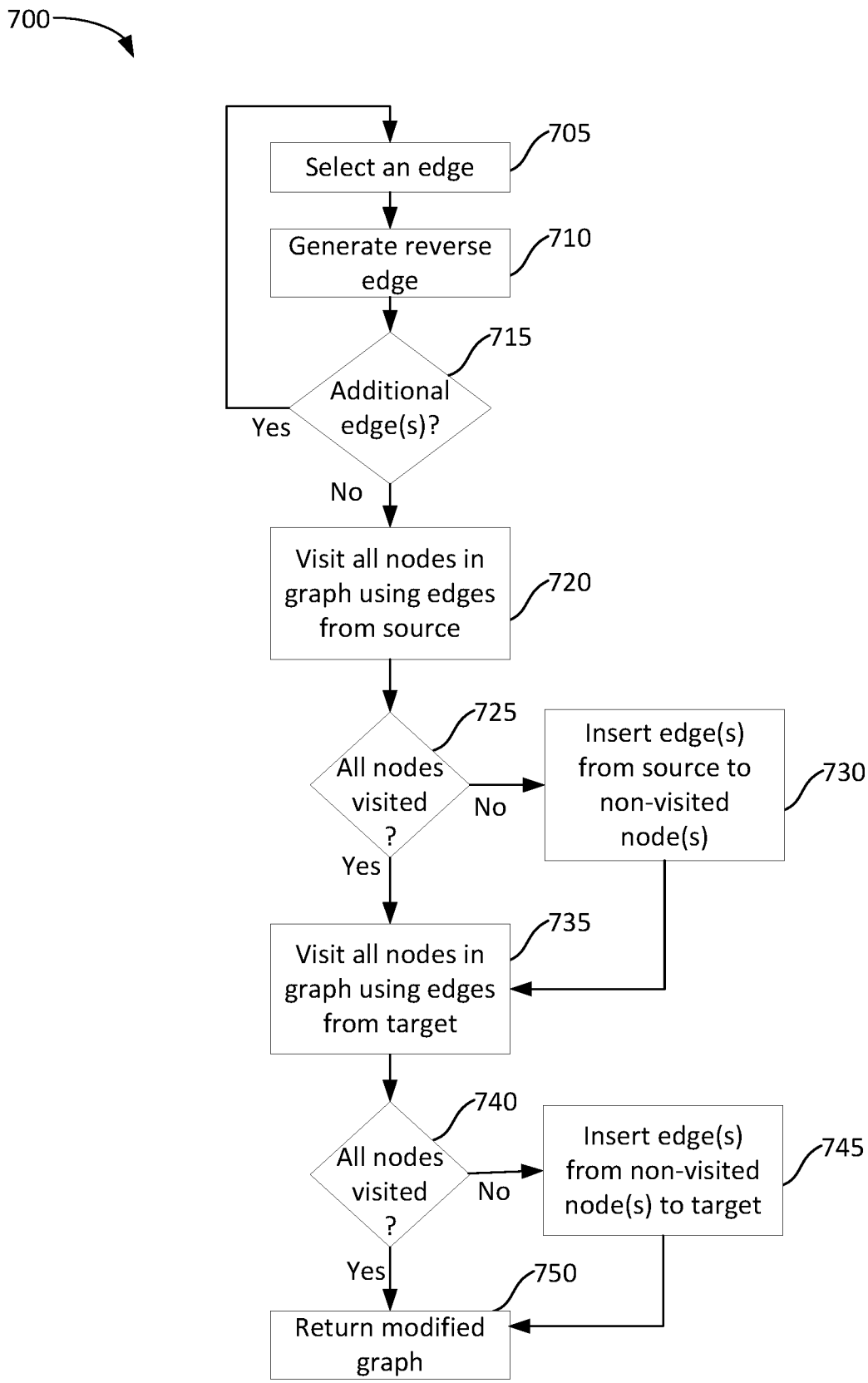
FIG. 7 depicts a flow diagram illustrating a method for enforcing topological validity while generating efficient process schedules.

FIG. 7 depicts a flow diagram illustrating a method 700 for enforcing topological validity while generating efficient process schedules.

In one embodiment, the method 700 provides additional detail for block 605 in FIG. 6 (ensuring the cuts will yield a valid topological ordering).

In the illustrated embodiment, the method 700 begins at block 705, where the processing system selects an edge in the graph. This initial selection may be accomplished in any number of ways, including randomly, as the processing system will iterate through all edges in the graph.

At block 710, the processing system generates a corresponding reverse edge for the selected edge. That is, if the selected edge traverses from a first node to a second node, the reverse edge is from the second node to the first node. In embodiments, this reverse edge is assigned a predefined weight or other flag indicating that it cannot be cut by a minimum cut. For example, in one embodiment, the processing system assigns an infinite (or an arbitrarily high) weight that would cause an infinite (or arbitrarily high) penalty to be applied for any cut that crosses in the wrong direction (e.g., in a direction that would violate the data dependencies in the graph).

At block 715, the processing system determines whether any additional edges remain to be evaluated. If so, the method 700 returns to block 705. In this way, the processing system inserts reverse edges to enforce the data dependencies in the graph and ensure any minimum cut results in a valid topological ordering. The method 700 then continues to block 720.

At block 720, the processing system attempts to visit all nodes in the graph by traversing directed edges from the source. This may include utilizing a breadth-first search or a depth-first search, depending on the particular implementation. In an embodiment, the processing system notes which nodes have been visited during this search. The method 700 then proceeds to block 725, where the processing system determines whether any nodes in the graph where not visited during this search. If so, the unvisited nodes are disconnected from the source, in that no valid path exists using directed edges to reach the node from the source. If all nodes were visited, the method 700 proceeds to block 735. If at least one node was not traversed during the search, however, the method 700 continues to block 730.

At block 730, the processing system inserts edge(s) with zero weight from the source to any nodes that were not visited during the search. This ensures that the non-visited nodes are fully connected to the source, and enforces topological validity of any computed minimum cuts. In one embodiment, the processing system additionally inserts an infinite weight reverse edge from the non-visited node(s) to the source. The method 700 then continues to block 735.

At block 735, the processing system performs another search to attempt to visit all nodes by traversing the reverse edges from the target. The system may similarly note which nodes are found/traversed during this search. In embodiments, this search may be performed depth-first or breadth-first.

The method 700 then continues to block 740, where the processing system determines whether all nodes were visited during this search from the target. If any nodes were not found, they are disconnected from the target and no valid path exists in the graph using the (forward) directed edges from the non-visited node to the target. If all nodes were found, the method 700 proceeds to block 750. If at least one node was not visited, however, the method 700 continues to block 745.

At block 745, the processing system inserts edge(s) with zero weight from the non-visited node(s) to the target. This ensures that the node is fully connected to the target, and enforces topological validity of any computed minimum cuts. In one embodiment, the processing system additionally inserts an infinite weight reverse edge from the target to the non-visited node(s). The method 700 then continues to block 750.

At block 750, the processing system returns the modified graph. In this way, the processing system ensures that each node is connected via a valid path to both the source and the target, in order to enforce the data dependencies in the graph and ensure any minimum cut results in a valid topological ordering.

Example Method for Modifying Graphs Using Deallocation Nodes

Figure 8:
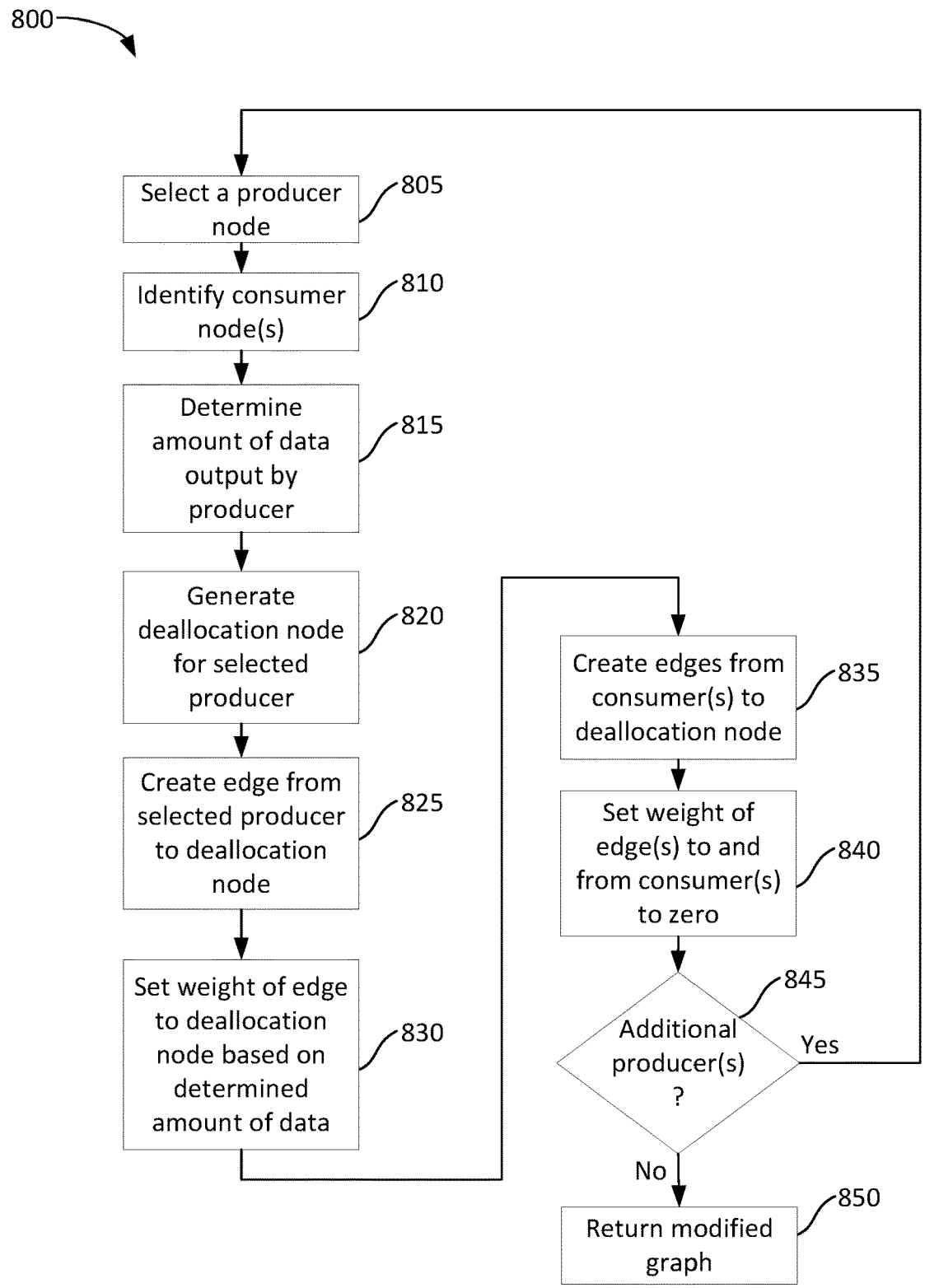
FIG. 8 depicts a flow diagram illustrating a method for handling parallel data flows to accurately generate efficient process schedules.

FIG. 8 depicts a flow diagram illustrating a method 800 for handling parallel data flows to accurately generate efficient process schedules.

In one embodiment, the method 800 provides additional detail for block 610 in FIG. 6 (inserting deallocation nodes as needed). The method 800 begins at block 805, where the processing system selects a producer node in the graph. In embodiments, producer nodes are any nodes that output data to one or more subsequent nodes (or to the target node).

In some embodiments, at block 805, the processing system selects a producer node from a subset of the producers in the graph. For example, in one embodiment, the method 800 is only applied to producer nodes that have more than one consumer. That is, because adding deallocation nodes for any producer with a single consumer is not needed and is potentially wasteful, the processing system may first identify all nodes that output to multiple consumers, and select from this identified subset. In another embodiment, the method 800 is applied to all producer nodes, regardless of the number of consumers each is associated with. In various embodiments, this initial selection may be accomplished in any number of ways, including randomly.

At block 810, the processing system identifies the set of consumer node(s) for the selected producer.

The method 800 then proceeds to block 815, where the processing system determines the amount of data that is output by the selected producer to the identified consumer (s). The amount of data produced will be used to set the weight of the edge to the deallocation node. For example, if the producer produces ten kilobyte of data (regardless of the number of consumers that use this data), the system will subsequently set the weight of the edge to the deallocation node to ten kilobytes. The method 800 then continues to block 820.

At block 820, the processing system generates a deallocation node for the selected producer. At block 825, the processing system then inserts an edge from the selected producer to the deallocation node.

The method 800 then proceeds to block 830, where the processing system assigns a weight to the newly-generated edge. In an embodiment, the weight of the edge is based on the (previously-determined) amount of data that is output by the producer node to the consumer(s). In some embodiments, the processing system also inserts a reverse edge with arbitrarily-high weight from the deallocation node to the selected producer node.

The method 800 then proceeds to block 835, where the processing system creates edges from each identified consumer of the selected producer, connecting them to the newly-created deallocation node.

At block 840, the processing system sets the weight of the edge to and from the identified consumers to zero. That is, the processing system sets the weight(s) of all edge(s) from the selected producer to the identified consumer(s) to zero. This ensures that the data for the producer-consumer(s) set is not counted multiple times in computing the minimum cuts. The system further sets the weight(s) of the newly-created edge(s) from each consumer to the deallocation node to zero.

At block 845, the processing system determines whether there is at least one additional producer (or one additional producer in the subset of producers with multiple consumers) that has not been evaluated. If so, the method 800 returns to block 805.

Otherwise, the method 800 continues to block 850, where the processing system returns this modified graph with deallocation nodes inserted.

Example Method for Finding Minimum Cuts

Figure 9:
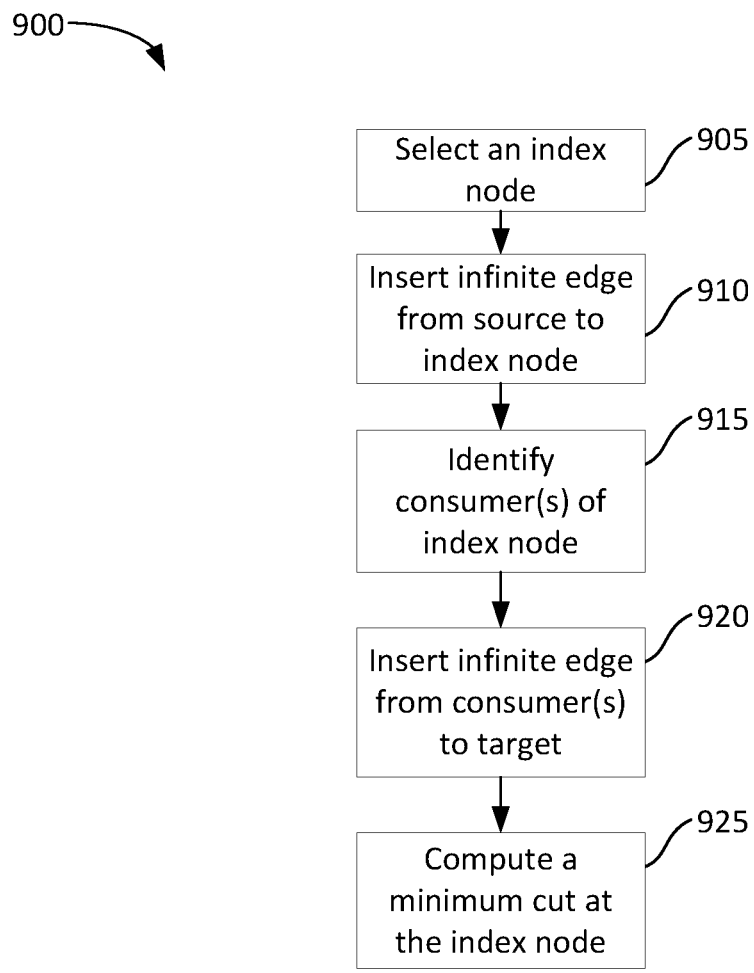
FIG. 9 depicts a flow diagram illustrating a method for dividing data flow graphs to generate topological orderings to yield efficient process schedules.

FIG. 9 depicts a flow diagram illustrating a method 900 for dividing data flow graphs to generate topological orderings to yield efficient process schedules.

In one embodiment, the method 900 provides additional detail for block 630 in FIG. 6 (generating a cut in a graph).

The method 900 begins at block 905, where the processing system selects an index node from the graph. In one embodiment, as discussed above, the processing system selects the index node based on the depth of each of the nodes. For example, the processing system may generate a depth score for each node based on its distance from the start node and to the end node, where higher depth scores correspond to nodes that are closer to the center of the graph (or subgraph). The processing system may then select, as the index node, the node with the largest depth score.

At block 910, the processing system inserts an infinite weight edge from the source node to the selected index node. This constrains the subsequent cut to occur after the index node.

Further, at block 915, the processing system identifies the consumer(s) of the index node.

At block 920, the processing system similarly inserts an infinite weight edge from each identified consumer to the target. This constrains the cut to occur before any of the identified consumers. In this way, the processing system can constrain the minimum cut techniques to cut immediately after the index node, separating it from its consumers.

The method 900 then continues to block 925, where the processing system generates a minimum cut for the index node. In embodiments, the minimum cut is found by identifying a set of edges to sever that will separate the source from the target while incurring the minimum penalty (based on edge weight), as discussed above.

Example Method for Generating Topological Orderings for Efficient Process Scheduling FIG. 10 depicts a flow diagram illustrating a method 1000 for generating and modifying topological orderings to improve process scheduling.

The method 1000 begins at block 1005, where a processing system receives a data flow graph for a process, wherein data flow graph comprises a plurality of nodes and a plurality of edges.

At block 1010, the processing system generates a topological ordering for the data flow graph based at least in part on memory utilization of the process.

In some aspects, the plurality of nodes in the data flow graph correspond to operations performed during the process, the plurality of edges in the data flow graph correspond to data passing among the operations, each respective edge of the plurality of edges is associated with a respective weight based on a size of the data associated with the respective edge, and generating the topological ordering comprises finding a set of minimum cuts in the data flow graph based on the weights.

In some aspects, finding the set of minimum cuts comprises modifying the data flow graph to enforce data dependencies by: for each respective edge of the plurality of edges, adding a respective backwards edge of infinite weight. In some aspects, finding the set of minimum cuts further comprises modifying the data flow graph to enforce data dependencies by ensuring that at least one valid path exists in the data flow graph from a source to each of the plurality of nodes and from each of the plurality of nodes to a sink.

In some aspects, finding the set of minimum cuts comprises assigning the weights to the plurality of edges by: identifying a producer node of the plurality of nodes that outputs data to at least one consumer node of the plurality of nodes; determining a size of the data output by the producer node; and inserting a deallocation node into the data flow graph by: creating a first edge with a weight corresponding to the size of the data output by the producer node, wherein the first edge is inserted from the producer node to the deallocation node; assigning weight of zero to an edge from the producer node to the at least one consumer node; and creating an edge from the at least one consumer node to the deallocation node, assigned a weight of zero.

In some aspects, finding the set of minimum cuts comprises, for a first index node of the plurality of nodes, constraining a first minimum cut to occur after the first index node by: creating a first edge with an infinite weight from a source to the first index node; identifying a set of consumer nodes, from the plurality of nodes, that receive data from the first index node; creating edges with an infinite weight from each consumer node in the set of consumer nodes to a sink; and computing the first minimum cut, wherein the first minimum cut places the first index node in a first portion of the data flow graph and all successors of the first index node in a second portion of the data flow graph.

In some aspects, finding the set of minimum cuts further comprises iteratively computing minimum cuts for index nodes in the first and second portions of the data flow graph and separating the first and second portions of the data flow graph based on the minimum cuts until a predefined stopping condition is satisfied.

In some aspects, the method 1000 further includes selecting the first index node based on determining that the first index node is centered in the data flow graph.

In some aspects, the method 1000 further includes determining that the first index node is one of a set of sibling nodes in the data flow graph; and computing the first minimum cut by constraining a first portion of the set of sibling nodes to the first portion of the data flow graph and a second portion of the set of sibling nodes to the second portion of the data flow graph.

At block 1015, the processing system generates a first modified topological ordering by inserting, into the topological ordering, one or more new nodes corresponding to memory access based on a predefined memory capacity.

At block 1020, the processing system allocates units of memory in the memory based on the first modified topological ordering.

At block 1025, the processing system generates a second modified topological ordering by rearranging one or more nodes in the first modified topological ordering, wherein the second modified topological ordering enables increased parallel utilization of a plurality of hardware components.

In some aspects, rearranging one or more nodes in the first modified topological ordering comprises moving one or more nodes corresponding to loading data from a host processing system memory into the memory to an earlier position in the topological ordering.

Example Systems for Generating and Executing Efficient Process Schedules

FIG. 11 depicts an example Processing System 1100, which may be configured to perform aspects of the various methods described herein, including, for example, the methods described with respect to FIGS. 4 and 6-10.

Processing System 1100 includes a central processing unit (CPU) 1102, which in some examples may be a multi-core CPU. Instructions executed at the CPU 1102 may be loaded, for example, from a program memory associated with the CPU 1102 or may be loaded from a memory 1114.

Processing System 1100 also includes additional processing components tailored to specific functions, such as a graphics processing unit (GPU) 1104, a digital signal processor (DSP) 1106, and a neural processing unit (NPU) 1108.

Though not depicted in FIG. 11, NPU 1108 may be implemented as a part of one or more of CPU 1102, GPU 1104, and/or DSP 1106.

Although not included in the illustrated embodiment, the Processing System 1100 may also include one or more input and/or output devices, such as screens, physical buttons, speakers, microphones, and the like.

Processing System 1100 also includes Memory 1114, which is representative of one or more static and/or dynamic memories, such as a dynamic random access memory, a flash-based static memory, and the like. In this example, Memory 1114 includes computer-executable components, which may be executed by one or more of the aforementioned processors of Processing System 1100.

In this example, Memory 1114 includes an Ordering Component 110, Memory Component 120, Reordering Component 125, Allocation Component 130, Data Graph(s) 105, Topological Ordering(s) 115, and Processing Schedule(s) 135. The depicted components, and others not depicted, may be configured to perform various aspects of the methods described herein. For example, the Ordering Component 110, Memory Component 120, Reordering Component 125, and Allocation Component 130 may analyze Data Graphs 105 to generate Topological Orderings 115 and Processing Schedules 135. These Processing Schedules 135 may be executed by the Processing System 1100, or may be used by one or more other devices or systems.

In the illustrated example, the Processing System 1100 also includes an Ordering Circuit 1120, a Memory Circuit 1122, a Reordering Circuit 1124, and an Allocation Circuit 1126. The depicted circuits, and others not depicted, may be configured to perform various aspects of the techniques described herein.

For example, the Ordering Circuit 1120 may be configured to perform the functionality of the Ordering Component 110, the Memory Circuit 1122 may be configured to perform the functionality of the Memory Component 120, the Reordering Circuit 1124 may be configured to perform the functionality of the Reordering Component 125, and the Allocation Circuit 1126 may be configured to perform the functionality of the Allocation Component 130.

Though depicted as separate components and circuits for clarity in FIG. 11, Ordering Circuit 1120, Memory Circuit 1122, Reordering Circuit 1124, and Allocation Circuit 1126 may collectively or individually be implemented in other processing devices of the Processing System 1100, such as within CPU 1102, GPU 1104, DSP 1106, NPU 1108, and the like.

Figure 12:
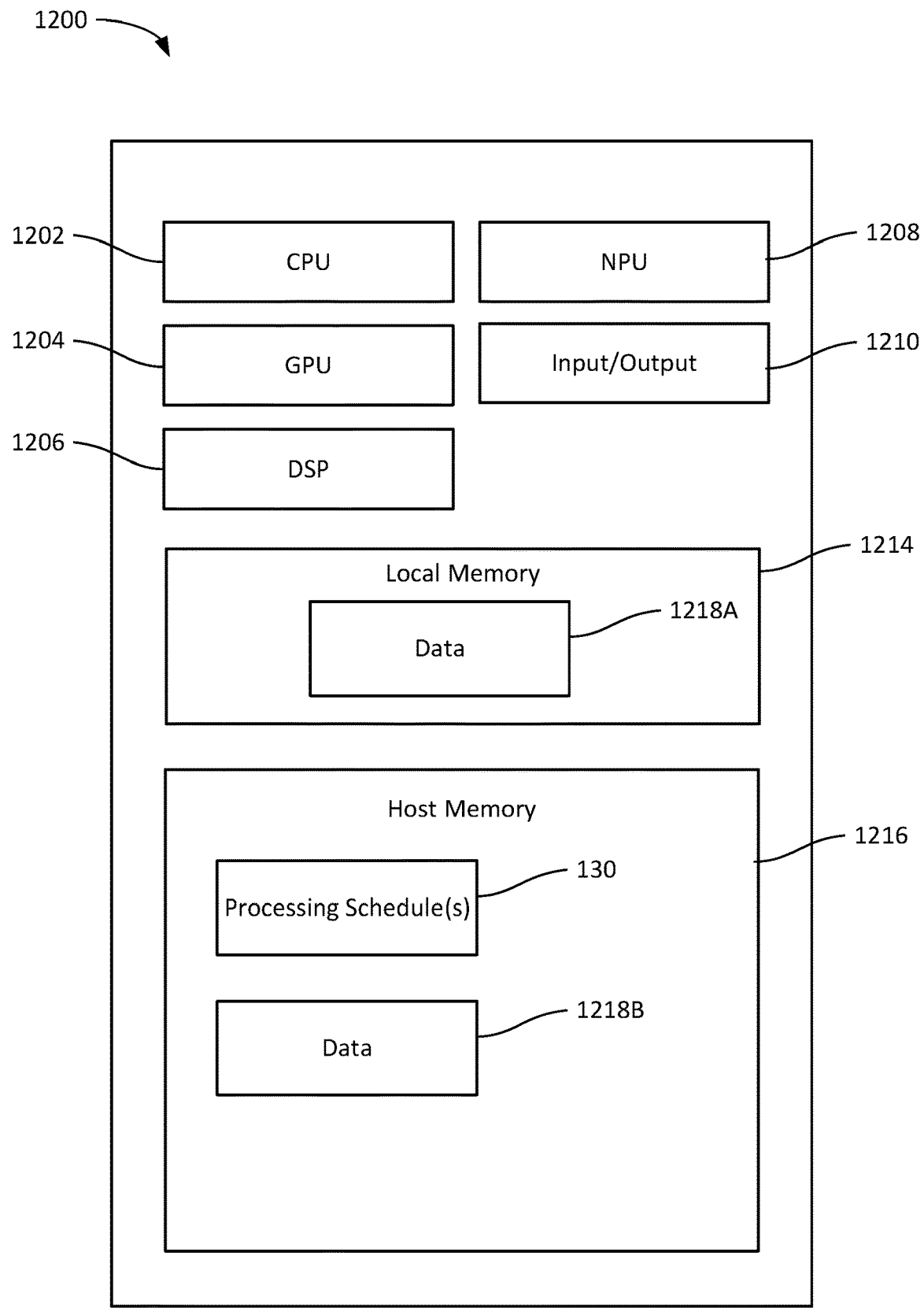
FIG. 12 depicts an example processing system, which may be configured to perform at least some of the methods described herein.

FIG. 12 depicts an example multi-processor Processing System 1200, which may be configured to perform aspects of the various methods described herein.

Processing System 1200 includes a central processing unit (CPU) 1202, which in some examples may be a multi-core CPU. Instructions executed at the CPU 1202 may be loaded, for example, from a program memory associated with the CPU 1202 or may be loaded from a Memory 1214 or Host Memory 1216.

Processing System 1200 also includes additional processing components tailored to specific functions, such as a graphics processing unit (GPU) 1204, a digital signal processor (DSP) 1206, and a neural processing unit (NPU) 1208. In some examples, one or more of the processors of Processing System 1200 may be based on an ARM or RISC-V instruction set.

Though not depicted in FIG. 12, NPU 1208 may be implemented as a part of one or more of CPU 1202, GPU 1204, and/or DSP 1206.

Although not included in the illustrated embodiment, the Processing System 1200 may also include one or more input and/or output devices, such as screens, physical buttons, speakers, microphones, and the like.

Processing System 1200 includes a Local Memory 1214, which is representative of memory or storage situated close to the various processing units. For example, the Local Memory 1214 may include tightly-coupled memory (TCM), SRAM, cache space, and the like. As illustrated, the Local Memory 1214 includes some Data 1218A. In an embodiment, this Data 1218A in the Local Memory 1214 may correspond to data that is currently being processed or used by the Processing System 1200 (e.g., while executing a process using a Processing Schedule 135).

Processing System 1200 also includes Host Memory 1216, which is representative of one or more static and/or dynamic memories, such as a dynamic random access memory, a flash-based static memory, and the like. In this example, Host Memory 1216 includes computer-executable Processing Schedule(s) 135, which may be executed by one or more of the aforementioned processors of Processing System 1200. In the illustrated embodiment, the Host Memory 1216 also includes Data 1218B. In some embodiments, this Data 1218B may be additional data for one or more ongoing operations (e.g., being executed according to a Processing Schedule 135) that does not fit within the limited space available in the Local Memory 1218A.

In some embodiments, the Processing System 1200 may move data back and forth between the Local Memory 1214 and the Host Memory 1216 while executing a Processing Schedule 135 using one or more processing units, as discussed above.

EXAMPLE CLAUSES

Clause 1: A method, comprising: receiving a data flow graph for a process, wherein data flow graph comprises a plurality of nodes and a plurality of edges; generating a topological ordering for the data flow graph based at least in part on memory utilization of the process; generating a first modified topological ordering by inserting, into the topological ordering, one or more new nodes corresponding to memory access based on a predefined memory capacity; allocating units of memory in the memory based on the first modified topological ordering; and generating a second modified topological ordering by rearranging one or more nodes in the first modified topological ordering, wherein the second modified topological ordering enables increased parallel utilization of a plurality of hardware components.

Clause 2: The method according to Clause 1, wherein rearranging one or more nodes in the first modified topological ordering comprises moving one or more nodes corresponding to loading data from a host processing system memory into the memory to an earlier position in the topological ordering.

Clause 3: The method according to any one of Clauses 1-2, wherein: the plurality of nodes in the data flow graph correspond to operations performed during the process, the plurality of edges in the data flow graph correspond to data passing among the operations, each respective edge of the plurality of edges is associated with a respective weight based on a size of the data associated with the respective edge, and generating the topological ordering comprises finding a set of minimum cuts in the data flow graph based on the weights.

Clause 4: The method according to any one of Clauses 1-3, wherein finding the set of minimum cuts comprises modifying the data flow graph to enforce data dependencies by, for each respective edge of the plurality of edges, adding a respective backwards edge of infinite weight.

Clause 5: The method according to any one of Clauses 1-4, wherein finding the set of minimum cuts further comprises modifying the data flow graph to enforce data dependencies by ensuring that at least one valid path exists in the data flow graph from a source to each of the plurality of nodes and from each of the plurality of nodes to a sink.

Clause 6: The method according to any one of Clauses 1-5, wherein finding the set of minimum cuts comprises assigning the weights to the plurality of edges by: identifying a producer node of the plurality of nodes that outputs data to at least one consumer node of the plurality of nodes; determining a size of the data output by the producer node; and inserting a deallocation node into the data flow graph by: creating a first edge with a weight corresponding to the size of the data output by the producer node, wherein the first edge is inserted from the producer node to the deallocation node; assigning weight of zero to an edge from the producer node to the at least one consumer node; and creating an edge from the at least one consumer node to the deallocation node, assigned a weight of zero.

Clause 7: The method according to any one of Clauses 1-6, wherein finding the set of minimum cuts comprises, for a first index node of the plurality of nodes, constraining a first minimum cut to occur after the first index node by: creating a first edge with an infinite weight from a source to the first index node; identifying a set of consumer nodes, from the plurality of nodes, that receive data from the first index node; creating edges with an infinite weight from each consumer node in the set of consumer nodes to a sink; and computing the first minimum cut, wherein the first minimum cut places the first index node in a first portion of the data flow graph and all successors of the first index node in a second portion of the data flow graph.

Clause 8: The method according to any one of Clauses 1-7, wherein finding the set of minimum cuts further comprises iteratively computing minimum cuts for index nodes in the first and second portions of the data flow graph and separating the first and second portions of the data flow graph based on the minimum cuts until a predefined stopping condition is satisfied.

Clause 9: The method according to any one of Clauses 1-8, further comprising selecting the first index node based on determining that the first index node is centered in the data flow graph.

Clause 10: The method according to any one of Clauses 1-9, further comprising: determining that the first index node is one of a set of sibling nodes in the data flow graph; and computing the first minimum cut by constraining a first portion of the set of sibling nodes to the first portion of the data flow graph and a second portion of the set of sibling nodes to the second portion of the data flow graph.

Clause 11: A system, comprising: a memory comprising computer-executable instructions; and one or more processors configured to execute the computer-executable instructions and cause the processing system to perform a method in accordance with any one of Clauses 1-10.

Clause 12: A system, comprising means for performing a method in accordance with any one of Clauses 1-10.

Clause 13: A non-transitory computer-readable medium comprising computer-executable instructions that, when executed by one or more processors of a processing system, cause the processing system to perform a method in accordance with any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    receiving a data flow graph for a process, wherein data flow graph comprises a plurality of nodes and a plurality of edges;
    generating a topological ordering for the data flow graph based at least in part on memory utilization of the process;
    generating a first modified topological ordering by inserting, into the topological ordering, one or more new nodes corresponding to memory access based on a predefined memory capacity;
    allocating units of memory in memory based on the first modified topological ordering; and
    generating a second modified topological ordering by rearranging one or more nodes in the first modified topological ordering, wherein the second modified topological ordering enables increased parallel utilization of a plurality of hardware components;
    wherein rearranging one or more nodes in the first modified topological ordering comprises moving one or more nodes corresponding to loading data from a host processing system memory into the memory to an earlier position in the topological ordering.

2. The method of claim 1, wherein:
    the plurality of nodes in the data flow graph correspond to operations performed during the process,
    the plurality of edges in the data flow graph correspond to data passing among the operations,
    each respective edge of the plurality of edges is associated with a respective weight based on a size of the data associated with the respective edge, and
    generating the topological ordering comprises finding a set of minimum cuts in the data flow graph based on the weights.

3. The method of claim 2, wherein finding the set of minimum cuts comprises modifying the data flow graph to enforce data dependencies by:
    for each respective edge of the plurality of edges, adding a respective backwards edge of infinite weight.

4. The method of claim 3, wherein finding the set of minimum cuts further comprises modifying the data flow graph to enforce data dependencies by:
    ensuring that at least one valid path exists in the data flow graph from a source to each of the plurality of nodes and from each of the plurality of nodes to a sink.

5. The method of claim 2, wherein finding the set of minimum cuts comprises assigning the weights to the plurality of edges by:
    identifying a producer node of the plurality of nodes that outputs data to at least one consumer node of the plurality of nodes;
    determining a size of the data output by the producer node; and
    inserting a deallocation node into the data flow graph by:
        creating a first edge with a weight corresponding to the size of the data output by the producer node, wherein the first edge is inserted from the producer node to the deallocation node;
        assigning weight of zero to an edge from the producer node to the at least one consumer node; and
        creating an edge from the at least one consumer node to the deallocation node, assigned a weight of zero.

6. The method of claim 2, wherein finding the set of minimum cuts comprises, for a first index node of the plurality of nodes, constraining a first minimum cut to occur after the first index node by:

creating a first edge with an infinite weight from a source to the first index node;

identifying a set of consumer nodes, from the plurality of nodes, that receive data from the first index node;

creating edges with an infinite weight from each consumer node in the set of consumer nodes to a sink; and computing the first minimum cut, wherein the first minimum cut places the first index node in a first portion of the data flow graph and all successors of the first index node in a second portion of the data flow graph.

7. The method of claim 6, wherein finding the set of minimum cuts further comprises iteratively computing minimum cuts for index nodes in the first and second portions of the data flow graph and separating the first and second portions of the data flow graph based on the minimum cuts until a predefined stopping condition is satisfied.

8. The method of claim 6, further comprising selecting the first index node based on determining that the first index node is centered in the data flow graph.

9. The method of claim 8, further comprising:
determining that the first index node is one of a set of sibling nodes in the data flow graph; and
computing the first minimum cut by constraining a first portion of the set of sibling nodes to the first portion of the data flow graph and a second portion of the set of sibling nodes to the second portion of the data flow graph.

10. A processing system, comprising:
a memory comprising computer-executable instructions; and
one or more processors configured to execute the computer-executable instructions and cause the processing system to perform one or more operations comprising:
receiving a data flow graph for a process, wherein data flow graph comprises a plurality of nodes and a plurality of edges;
generating a topological ordering for the data flow graph based at least in part on memory utilization of the process;
generating a first modified topological ordering by inserting, into the topological ordering, one or more new nodes corresponding to memory access based on a predefined memory capacity;
allocating units of memory in memory based on the first modified topological ordering; and
generating a second modified topological ordering by rearranging one or more nodes in the first modified topological ordering, wherein the second modified topological ordering enables increased parallel utilization of a plurality of hardware components;
wherein rearranging one or more nodes in the first modified topological ordering comprises moving one or more nodes corresponding to loading data from a host processing system memory into the memory to an earlier position in the topological ordering.

11. The processing system of claim 10, wherein:
the plurality of nodes in the data flow graph correspond to operations performed during the process,
the plurality of edges in the data flow graph correspond to data passing among the operations,
each respective edge of the plurality of edges is associated with a respective weight based on a size of the data associated with the respective edge, and
generating the topological ordering comprises finding a set of minimum cuts in the data flow graph based on the weights.

12. The processing system of claim 11, wherein finding the set of minimum cuts comprises modifying the data flow graph to enforce data dependencies by:
for each respective edge of the plurality of edges, adding a respective backwards edge of infinite weight.

13. The processing system of claim 12, wherein finding the set of minimum cuts further comprises modifying the data flow graph to enforce data dependencies by:
ensuring that at least one valid path exists in the data flow graph from a source to each of the plurality of nodes and from each of the plurality of nodes to a sink.

14. The processing system of claim 11, wherein finding the set of minimum cuts comprises assigning the weights to the plurality of edges by:
identifying a producer node of the plurality of nodes that outputs data to at least one consumer node of the plurality of nodes;
determining a size of the data output by the producer node; and
inserting a deallocation node into the data flow graph by:
creating a first edge with a weight corresponding to the size of the data output by the producer node, wherein the first edge is inserted from the producer node to the deallocation node;
assigning weight of zero to an edge from the producer node to the at least one consumer node; and
creating an edge from the at least one consumer node to the deallocation node, assigned a weight of zero.

15. The processing system of claim 11, wherein finding the set of minimum cuts comprises, for a first index node of the plurality of nodes, constraining a first minimum cut to occur after the first index node by:
creating a first edge with an infinite weight from a source to the first index node;
identifying a set of consumer nodes, from the plurality of nodes, that receive data from the first index node;
creating edges with an infinite weight from each consumer node in the set of consumer nodes to a sink; and
computing the first minimum cut, wherein the first minimum cut places the first index node in a first portion of the data flow graph and all successors of the first index node in a second portion of the data flow graph.

16. The processing system of claim 15, wherein finding the set of minimum cuts further comprises iteratively computing minimum cuts for index nodes in the first and second portions of the data flow graph and separating the first and second portions of the data flow graph based on the minimum cuts until a predefined stopping condition is satisfied.

17. The processing system of claim 15, further comprising selecting the first index node based on determining that the first index node is centered in the data flow graph.

18. The processing system of claim 17, further comprising:
determining that the first index node is one of a set of sibling nodes in the data flow graph; and
computing the first minimum cut by constraining a first portion of the set of sibling nodes to the first portion of the data flow graph and a second portion of the set of sibling nodes to the second portion of the data flow graph.

19. The processing system of claim 10, further comprising:
an ordering component configured to generate the topological ordering;
a memory component configured to generate the first modified topological ordering by inserting the one or more new nodes corresponding to memory access;

an allocation component configured to allocate the units of memory; and a reordering component configured to generate the second topological ordering by rearranging one or more nodes in the first modified topological ordering.

20. A non-transitory computer-readable medium comprising computer-executable instructions that, when executed by one or more processors of a processing system, cause the processing system to perform an operation comprising:

receiving a data flow graph for a process, wherein data flow graph comprises a plurality of nodes and a plurality of edges;

generating a topological ordering for the data flow graph based at least in part on memory utilization of the process;

generating a first modified topological ordering by inserting, into the topological ordering, one or more new nodes corresponding to memory access based on a predefined memory capacity;

allocating units of memory in memory based on the first modified topological ordering; and generating a second modified topological ordering by rearranging one or more nodes in the first modified topological ordering, wherein the second modified topological ordering enables increased parallel utilization of a plurality of hardware components;

wherein rearranging one or more nodes in the first modified topological ordering comprises moving one or more nodes corresponding to loading data from a host processing system memory into the memory to an earlier position in the topological ordering.

21. The non-transitory computer-readable medium of claim 20, wherein:

the plurality of nodes in the data flow graph correspond to operations performed during the process, the plurality of edges in the data flow graph correspond to data passing among the operations, each respective edge of the plurality of edges is associated with a respective weight based on a size of the data associated with the respective edge, and generating the topological ordering comprises finding a set of minimum cuts in the data flow graph based on the weights.

22. The non-transitory computer-readable medium of claim 21, wherein finding the set of minimum cuts comprises modifying the data flow graph to enforce data dependencies by:

for each respective edge of the plurality of edges, adding a respective backwards edge of infinite weight; and ensuring that at least one valid path exists in the data flow graph from a source to each of the plurality of nodes and from each of the plurality of nodes to a sink.

23. The non-transitory computer-readable medium of claim 21, wherein finding the set of minimum cuts comprises assigning the weights to the plurality of edges by:

identifying a producer node of the plurality of nodes that outputs data to at least one consumer node of the plurality of nodes;

determining a size of the data output by the producer node; and inserting a deallocation node into the data flow graph by:
creating a first edge with a weight corresponding to the size of the data output by the producer node, wherein the first edge is inserted from the producer node to the deallocation node;

assigning weight of zero to an edge from the producer node to the at least one consumer node; and creating an edge from the at least one consumer node to the deallocation node, assigned a weight of zero.

24. The non-transitory computer-readable medium of claim 21, wherein finding the set of minimum cuts comprises, for a first index node of the plurality of nodes, constraining a first minimum cut to occur after the first index node by:

creating a first edge with an infinite weight from a source to the first index node;

identifying a set of consumer nodes, from the plurality of nodes, that receive data from the first index node;

creating edges with an infinite weight from each consumer node in the set of consumer nodes to a sink; and computing the first minimum cut, wherein the first minimum cut places the first index node in a first portion of the data flow graph and all successors of the first index node in a second portion of the data flow graph.

25. The non-transitory computer-readable medium of claim 24, wherein finding the set of minimum cuts further comprises iteratively computing minimum cuts for index nodes in the first and second portions of the data flow graph and separating the first and second portions of the data flow graph based on the minimum cuts until a predefined stopping condition is satisfied.

26. The non-transitory computer-readable medium of claim 25, further comprising:

selecting the first index node based on determining that the first index node is centered in the data flow graph;

determining that the first index node is one of a set of sibling nodes in the data flow graph; and computing the first minimum cut by constraining a first portion of the set of sibling nodes to the first portion of the data flow graph and a second portion of the set of sibling nodes to the second portion of the data flow graph.

27. A processing system, comprising:

means for receiving a data flow graph for a process, wherein data flow graph comprises a plurality of nodes and a plurality of edges;

means for generating a topological ordering for the data flow graph based at least in part on memory utilization of the process;

means for generating a first modified topological ordering by inserting, into the topological ordering, one or more new nodes corresponding to memory access based on a predefined memory capacity;

means for allocating units of memory in memory based on the first modified topological ordering; and means for generating a second modified topological ordering by rearranging one or more nodes in the first modified topological ordering, wherein the second modified topological ordering enables increased parallel utilization of a plurality of hardware components;

wherein rearranging one or more nodes in the first modified topological ordering comprises moving one or more nodes corresponding to loading data from a host processing system memory into the memory to an earlier position in the topological ordering.

* * * * *